(12) United States Patent
Sasaki et al.

(10) Patent No.: US 9,507,863 B2
(45) Date of Patent: *Nov. 29, 2016

(54) CONTENT LIST DISPLAY METHOD, CONTENT LIST DISPLAY APPARATUS, CONTENT SELECTING AND PROCESSING METHOD, AND CONTENT SELECTING AND PROCESSING APPARATUS

(71) Applicant: Sony Corporation, Tokyo (JP)

(72) Inventors: Toru Sasaki, Tokyo (JP); Yoichiro Sako, Tokyo (JP); Toshiro Terauchi, Tokyo (JP); Takatoshi Nakamura, Kanagawa (JP); Yuichi Abe, Tokyo (JP); Mitsuru Takehara, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/104,949

(22) Filed: Dec. 12, 2013

(65) Prior Publication Data

US 2014/0108444 A1 Apr. 17, 2014

Related U.S. Application Data

(63) Continuation of application No. 11/728,548, filed on Mar. 26, 2007, now Pat. No. 8,631,023.

(30) Foreign Application Priority Data

Mar. 27, 2006 (JP) ................. 2006-085281

(51) Int. Cl.
G06F 17/30 (2006.01)
(52) U.S. Cl.
CPC ..... *G06F 17/30864* (2013.01); *G06F 17/3005* (2013.01); *G06F 17/30064* (2013.01)
(58) Field of Classification Search
CPC .................................. G06F 17/3005

USPC ......................................................... 707/758
See application file for complete search history.

(56) References Cited

U.S. PATENT DOCUMENTS

| | | | |
|---|---|---|---|
| 5,585,838 A | 12/1996 | Lawler et al. | |
| 2002/0055934 A1 | 5/2002 | Lipscomb et al. | |
| 2003/0156479 A1* | 8/2003 | Fujiyoshi | G06F 3/04817 365/200 |
| 2004/0122958 A1* | 6/2004 | Wardrop | G06F 17/30206 709/229 |
| 2005/0008264 A1 | 1/2005 | Iida et al. | |

(Continued)

FOREIGN PATENT DOCUMENTS

| | | |
|---|---|---|
| JP | 2000-134566 | 5/2000 |
| JP | 2000-207415 | 7/2000 |

(Continued)

OTHER PUBLICATIONS

Musicmobs Inc: "Mobster: a better way to browse your music," http://web.archive.org/web/20041114085206/mmobster.sourceforge.net, Nov. 14, 2004, XP002391684.

*Primary Examiner* — William Spieler
(74) *Attorney, Agent, or Firm* — Wolf, Greenfield & Sacks, P.C.

(57) ABSTRACT

A content list display method includes the step of displaying a list of private content owned by a user and public content not owned by the user on a screen by using a predetermined common attribute as a search key attribute for search and display such that a difference between the private content and the public content can be visually recognized.

25 Claims, 14 Drawing Sheets

(56) References Cited

U.S. PATENT DOCUMENTS

| | | | |
|---|---|---|---|
| 2005/0060286 A1* | 3/2005 | Hansen | G06F 17/30864 |
| 2005/0114374 A1 | 5/2005 | Juszkiewicz et al. | |
| 2005/0160375 A1 | 7/2005 | Sciammarella et al. | |
| 2005/0210410 A1 | 9/2005 | Ohwa et al. | |
| 2005/0216855 A1 | 9/2005 | Kopra et al. | |
| 2005/0289127 A1* | 12/2005 | Giampaolo | G06F 17/301 |
| 2006/0184960 A1* | 8/2006 | Horton | G06Q 30/00 725/25 |
| 2007/0010195 A1* | 1/2007 | Brown et al. | 455/3.06 |
| 2007/0022374 A1 | 1/2007 | Huang et al. | |
| 2007/0179967 A1 | 8/2007 | Zhang | |
| 2007/0208802 A1 | 9/2007 | Barman et al. | |
| 2007/0223037 A1 | 9/2007 | Sasaki et al. | |

FOREIGN PATENT DOCUMENTS

| | | |
|---|---|---|
| JP | 2001-110171 | 4/2001 |
| JP | 2003-099658 | 4/2003 |
| JP | 2005-122075 | 5/2005 |
| JP | 2005-331682 | 12/2005 |
| WO | WO 03/017100 A2 | 2/2003 |
| WO | WO 2004/008460 A | 1/2004 |

* cited by examiner

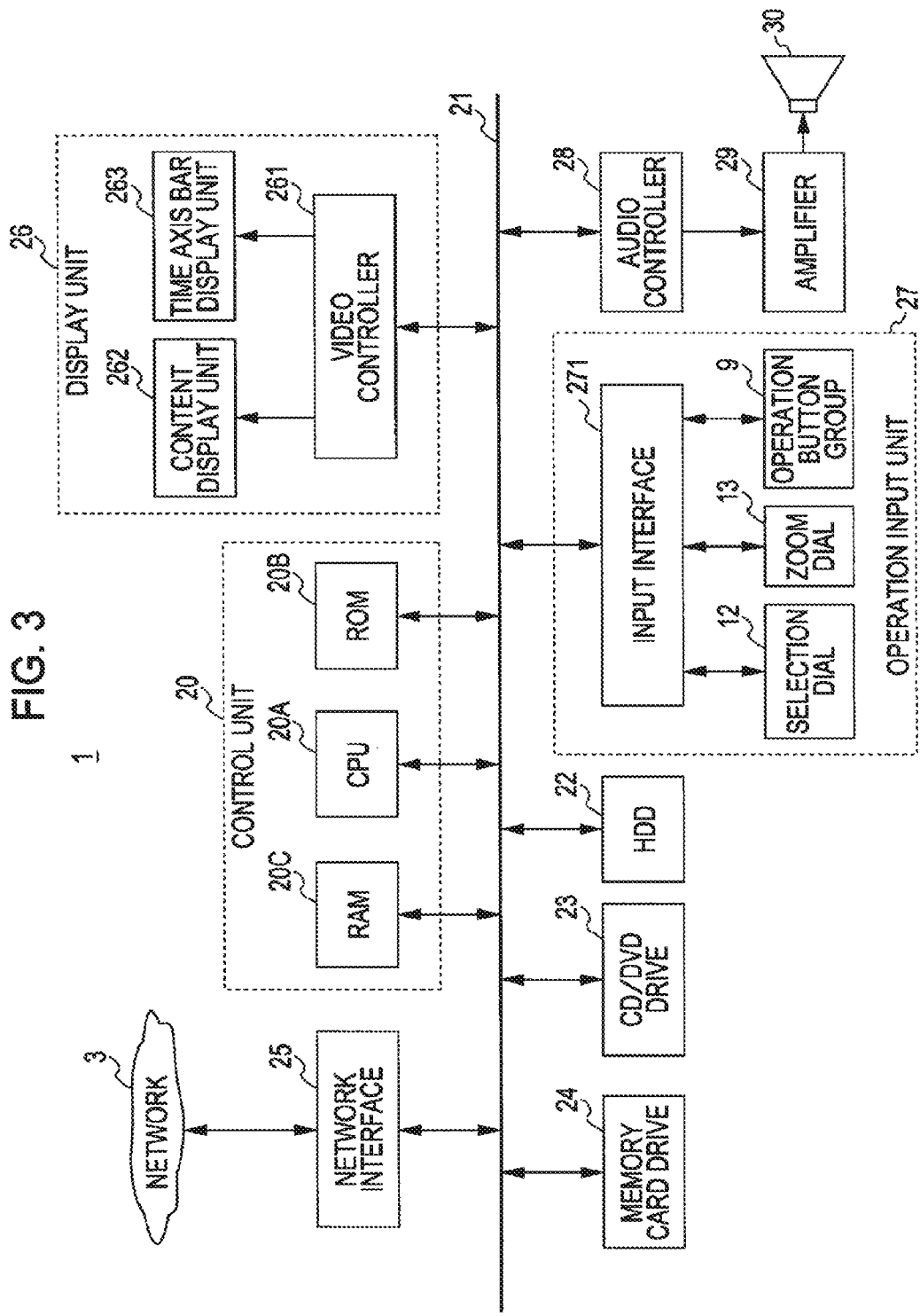

FIG. 4

| SONG CONTENT ID |
| ACCESS PATH (OPTION) |
| CONTENT FILE PATH |
| FILE NAME |
| SONG TITLE |
| ALBUM NAME |
| ARTIST NAME |
| DURATION OF PLAY |
| JACKET IMAGE DATA PATH |
| DATE OF RELEASE |
| ... |
| READ/WRITE ATTRIBUTE |
| ACCESS PERMISSION INFORMATION (OPTION) |
| ... |
| TEST-LISTEN DATA FILE PATH (OPTION) |
| ... |

OWNER   GROUP   OTHERS
 r w     r w     r w 1 1     0 0     0 0
(OWNER CAN PERFORM READ
AND WRITE)

1 1     1 0     1 0
(EVERYONE CAN PERFORM READ,
OWNER CAN PERFORM CHANGE
AND DELETION)

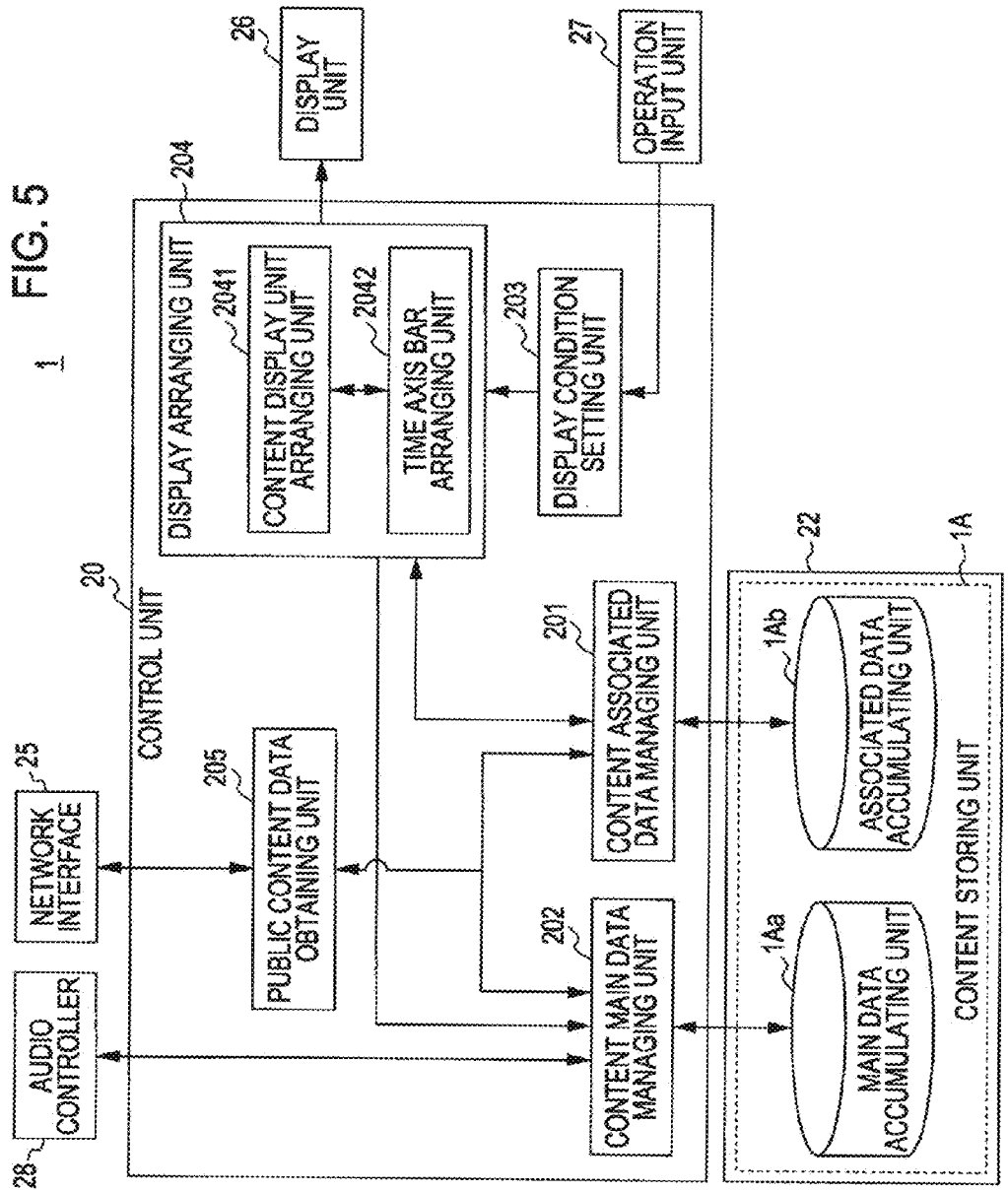

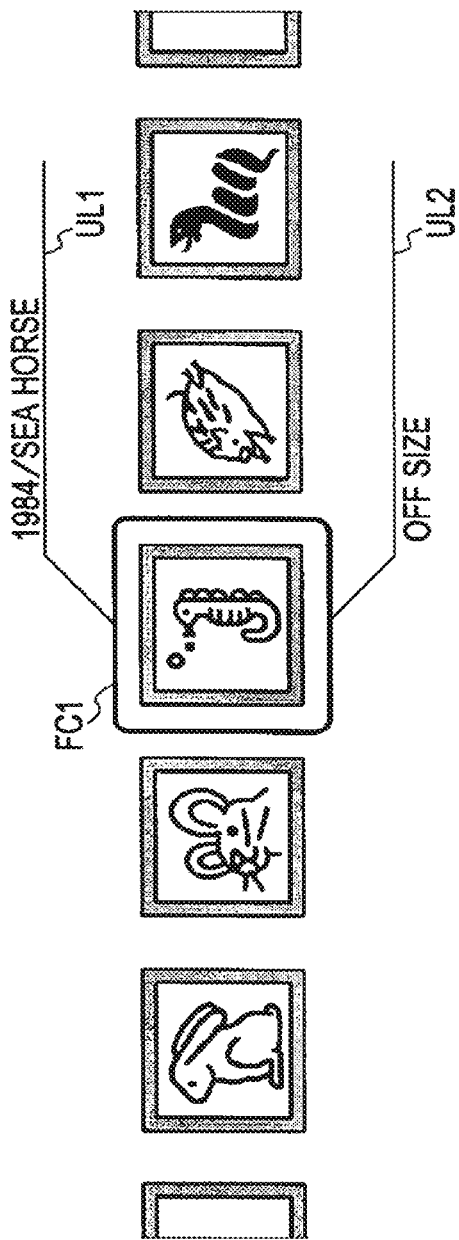
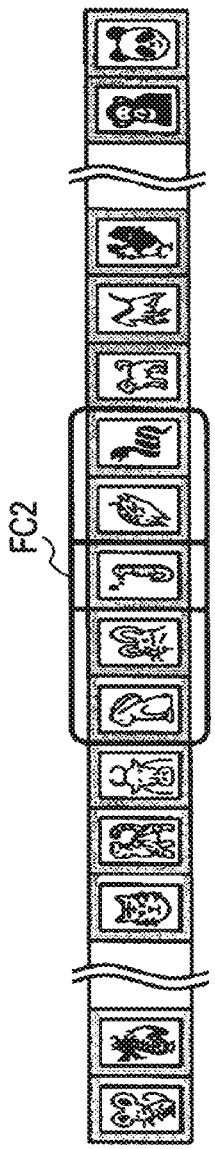
FIG. 7A
FIG. 7B

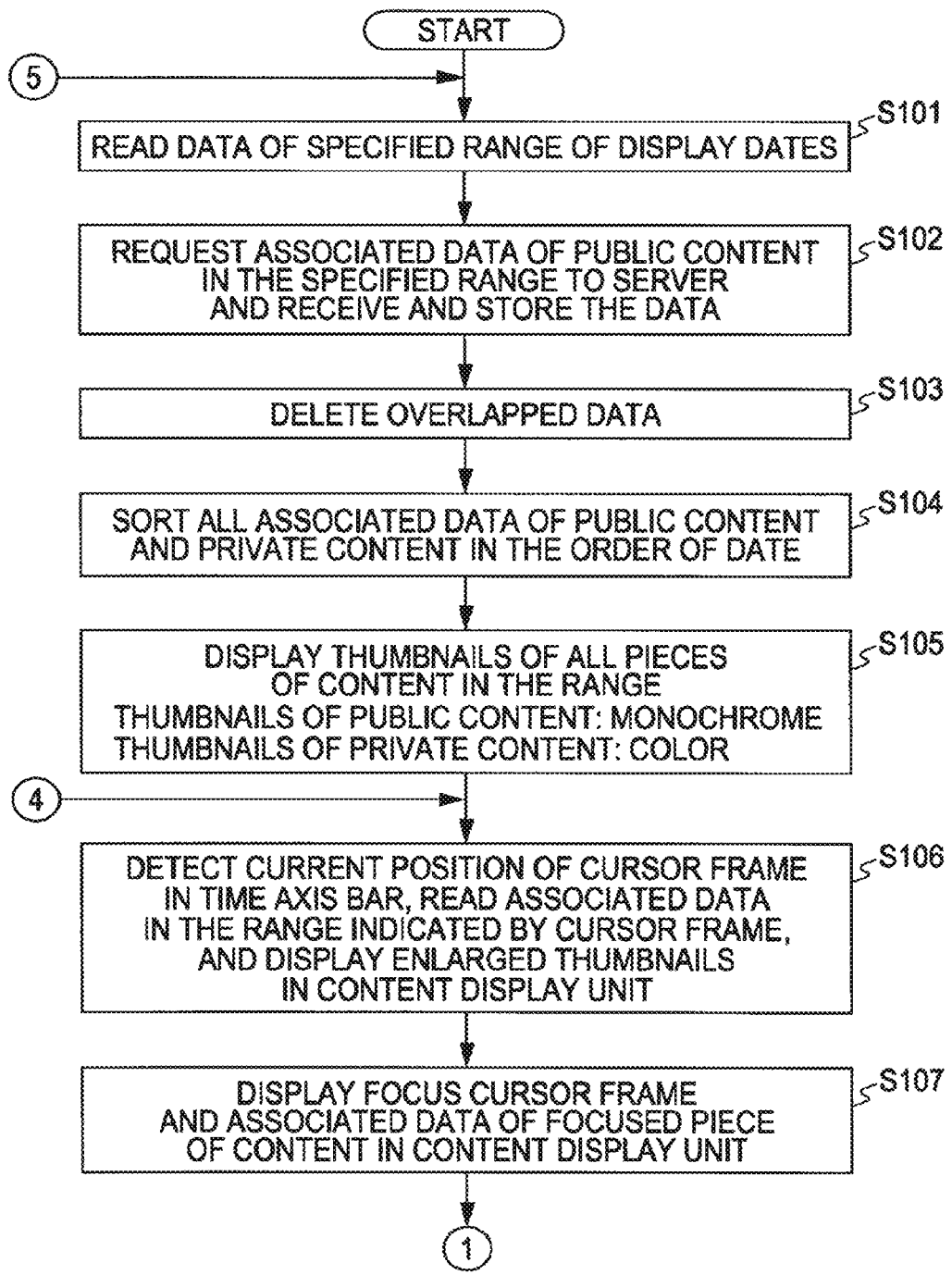

FIG. 14

| SONG CONTENT ID |
| --- |
| ACCESS PATH (OPTION) |
| CONTENT FILE PATH |
| FILE NAME |
| SONG TITLE |
| ALBUM NAME |
| ARTIST NAME |
| DURATION OF PLAY |
| JACKET IMAGE DATA PATH |
| DATE OF RELEASE |
| ⋮ |
| READ/WRITE ATTRIBUTE |
| ACCESS PERMISSION INFORMATION (OPTION) |
| ⋮ |
| TEST-LISTEN DATA FILE PATH (OPTION) |
| OWNERSHIP ATTRIBUTE |
| ⋮ |

CONTENT LIST DISPLAY METHOD, CONTENT LIST DISPLAY APPARATUS, CONTENT SELECTING AND PROCESSING METHOD, AND CONTENT SELECTING AND PROCESSING APPARATUS

CROSS REFERENCES TO RELATED APPLICATIONS

This application is a continuation of U.S. patent application Ser. No. 11/728,548, titled "Content List Display Method, Content List Display Apparatus, Content Selecting and Processing Method, and Content Selecting and Processing Apparatus," filed Mar. 26, 2007, which claims priority to Japanese Patent Application No. JP2006-085281, filed Mar. 27, 2006. Each of the foregoing documents is incorporated herein by reference in its entirety.

BACKGROUND OF THE INVENTION

1. Field of the Invention

The present invention relates to a content list display method and a content list display apparatus for displaying a list of content, such as music, movies, and electronic books, on a display screen. Also, the present invention relates to a content selecting and processing method and a content selecting and processing apparatus for selecting a specific piece of content from the content list displayed by the content list display method and processing the selected piece of content.

2. Description of the Related Art

In this specification, "content" means content information of music, video (movies, television broadcasted programs, captured images, and so on), electronic books (text information and still image information of papers, novels, and magazines), guide information, web pages, and programs (including a game program), expressed by signals.

There has been provided a content storing and playing back apparatus capable of storing a large amount of content in a built-in content storing unit, such as a mass storage hard disk or a semiconductor memory, and playing back a piece of content selected by a user.

In such a content storing and playing back apparatus, a list of content stored in the content storing unit is displayed so that a user can select a piece of content from the list. Accordingly, the user can quickly find a desired piece of content from a large amount of content stored in the content storing unit (for example, see Patent Document 1: Japanese Unexamined Patent Application Publication No. 2001-110171).

In the content storing and playing back apparatus, a new piece of content can be captured into the content storing unit via a network, such as the Internet (for example, see Patent Document 2: Japanese Unexamined Patent Application Publication No. 2005-122075).

Typically, in this case, information about a list of distributable content is transmitted from a content distributing server. Thus, a user selects a desired piece of content from the list and requests distribution of the selected piece of content.

SUMMARY OF THE INVENTION

Herein, the content stored in the content storing unit is owned by the user and can be called private content. On the other hand, the content that exists in the distributing server and is not yet owned by any user can be called public content.

Each of the lists described in Patent Documents 1 and 2 is displayed on a display screen of the content storing and playing back apparatus. However, the lists are not displayed on the same display screen at the same time, and an apparatus for displaying the both lists on the same screen has not been provided.

This is inconvenient because it may be impossible to search for private content and public content on the same display screen at the same time.

The present invention is directed to providing a method and an apparatus for solving this problem.

In order to solve the above-described problem, according to an embodiment of the present invention, there is provided a content list display method including the step of displaying a list of private content owned by a user and public content not owned by the user on a screen by using a predetermined common attribute as a search key attribute for search and display such that a difference between the private content and the public content can be visually recognized.

According to the embodiment of the present invention, the private content and the public content associated with a predetermined search key attribute are displayed on a screen such that a difference between the both types of content can be visually recognized. Thus, a user can select a piece of content while being aware of the difference.

In the content list display method, data of the private content and the public content includes main data and associated data contributing to display of the list, the main data and the associated data of the private content are stored in a content storing unit of a terminal owned by the user, the main data of the public content is not stored in the content storing unit, and the list is displayed by using the associated data of the private content and the public content.

Herein, content is determined to be the public content or the private content on the basis of whether main data of the content is stored in the content storing unit. The list is displayed by using the associated data.

In the content list display method, data of the private content and the public content includes main data and associated data contributing to display of the list, and the associated data includes distinguishing information to distinguish the private content from the public content, the distinguishing information being used to perform display such that a difference between the private content and the public content can be visually recognized.

According to the embodiment of the present invention, a list of private content and public content is displayed on a screen by using a predetermined attribute as a search key attribute such that the both types of content can be distinguished from each other. Thus, the user can easily select a piece of public content as well as private content owned by him/her.

BRIEF DESCRIPTION OF THE DRAWINGS

FIG. 3 is a block diagram showing an example of a configuration of the audio apparatus according to the embodiment;

FIG. 4 illustrates an example of associated data according to the embodiment;

FIG. 5 is a functional block diagram showing a main part of the audio apparatus according to the embodiment;

FIGS. 7A and 7B illustrate an example of display of a content list according to the embodiment of the present invention;

FIG. 11 shows part of a flowchart illustrating an example of a content list display process according to the embodiment of the present invention;

FIG. 14 illustrates another example of the associated data according to the embodiment of the present invention.

DESCRIPTION OF THE PREFERRED EMBODIMENTS

Hereinafter, an embodiment of the present invention is described with reference to the drawings. In this embodiment, song content is used as an example of content and an audio apparatus is used as an example of a content list display apparatus or a content selecting and processing apparatus.

The audio apparatus according to the embodiment described below displays a content list listing pieces of song content in the order of date and time of release so that a user can search for a piece of song content by using a time attribute, such as a date of release of the song content (e.g., date of sale or date of announcement), as a search attribute key.

Figure 1:
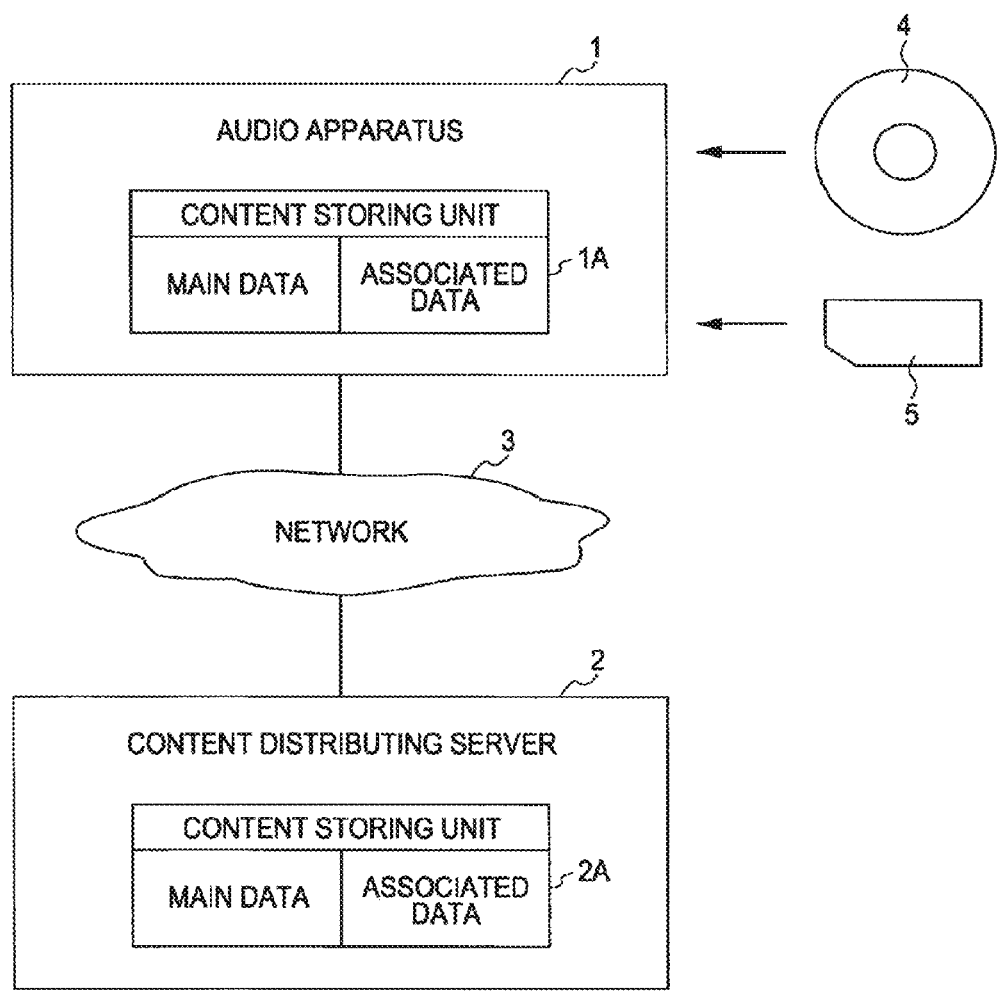
FIG. 1 illustrates an overview of a system configuration including an audio apparatus to which a content list display apparatus according to an embodiment of the present invention is applied.

FIG. 1 illustrates an overview of a system configuration including the audio apparatus according to the embodiment.

When a user wants to obtain public content that is not owned by him/her, the user can obtain it via a so-called package medium, such as a disc medium including a CD (compact disc) and a DVD (digital versatile disc) or a memory medium including a memory card, or via a network, such as the Internet, from a content distributing server.

The audio apparatus 1 according to this embodiment has a function of accessing a content distributing server 2 via a network 3 and a function of reading/writing data from/on an optical disc 4 or a card memory 5, under consideration of the above-described methods for obtaining public content.

In this embodiment, content data of song content includes song data serving as main data and associated data, which is described below. The audio apparatus 1 and the content distributing server 2 include content storing units 1A and 2A, respectively, for storing content data of the song content.

In this embodiment, after a user has obtained (purchased or been assigned with) the public content in any method and has stored main data (song data) of the public content as his/her possession in the content storing unit 1A of the audio apparatus 1 of the user, the obtained public content is managed as private content in the audio apparatus 1 thereafter.

Note that, in the audio apparatus 1, the user can obtain only associated data of public content without obtaining song data as main data in this embodiment. In this state, however, the main data is not owned by the user, and thus the public content is managed as public content.

Figure 2:
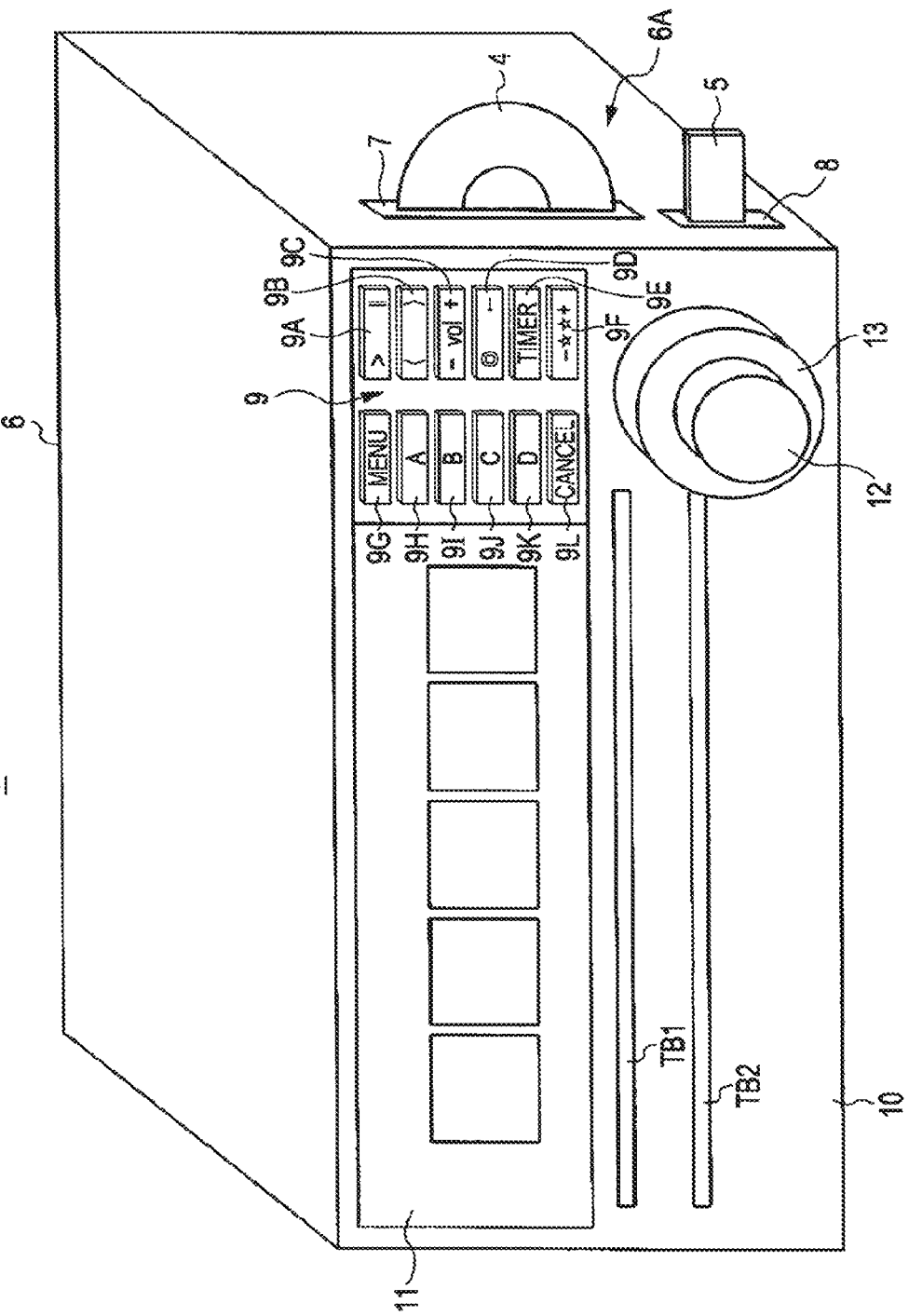
FIG. 2 shows an example of appearance of the audio apparatus according to the embodiment.

FIG. 2 shows an example of appearance of the audio apparatus 1 according to this embodiment. FIG. 3 is a block diagram showing an example of a configuration of the audio apparatus 1 according to this embodiment.

As shown in FIG. 2, the audio apparatus 1 according to this embodiment includes a slot 7 for a disc 4, such as a CD or a DVD, and a slot 8 for a memory card 5. The slots 7 and 8 are provided on a side surface 6A of a cabinet 6.

An operation button group 9 including operation buttons 9A to 9L is provided at a predetermined position of a front panel 10, which is provided on a front surface of the cabinet 6 of the audio apparatus 1. The operation buttons constituting the operation button group 9 include a playback button 9A, a skip button 9B, a volume adjusting button 9C, and a menu button 9G. The skip button 9B and the volume adjusting button 9C are so-called seesaw buttons. The skip button 9B can indicate a skip direction, which is described below. The volume adjusting button 9C can provide instructions to turn up/down volume.

The front panel 10 is also provided with a content display unit 11 including an LCD (liquid crystal display) and time axis bars TB1 and TB2 also including an LCD. A display device in the content display unit 11 has a relatively large screen, as shown in FIG. 2. Each of the time axis bars TB1 and TB2 has a long and thin screen.

As described below, images corresponding to pieces of song content to be selected or played back (e.g., thumbnails of jacket photos of CDs or DVDs) are displayed in the time axis bars TB1 and TB2 and the content display unit 11. In this example, as described below, images corresponding to a plurality of pieces of song content near a piece selected in the time axis bar TB1 or TB2 are displayed in the content display unit 11 in an enlarged size.

Also, the front panel 10 is provided with turning knobs, such as a selection dial 12 and a zoom dial 13, which can be turned by a user. The selection dial 12 is a turning knob used to change a time-axis position in the time axis bars TB1 and TB2. The zoom dial 13 is a turning knob used to change and set a range of time axis (maximum value of a range of display dates) to be displayed in the time axis bars TB1 and TB2.

An example of an internal circuit configuration of the audio apparatus 1 is shown in FIG. 3. That is, as shown in FIG. 3, the audio apparatus 1 includes a control unit 20, a hard disk device (HDD) 22, a CD/DVD drive 23, a memory card drive 24, a network interface 25, a display unit 26, an operation input unit 27, and an audio controller 28, which connect to a system bus 21.

The control unit 20 controls operations of the entire audio apparatus 1 and includes a CPU (central processing unit) 20A, a ROM (read only memory) 20B, and a RAM (random access memory) 20C. The CPU 20A, the ROM 20B, and the RAM 20C connect to each other via the system bus 21 and transmit/receive data and control signals via the system bus 21. Accordingly, the CPU 20A executes a control process described below.

The ROM 20B stores various programs executed by the CPU 20A (a display process, a song data decoding process, a user interface process, a data reading/writing process, and so on), an apparatus ID, character data, and so on. The RAM 20C is used as a work area for executing the above-described various programs or a work area for decoding or decompressing compressed song data. Also, the RAM 20C is used for temporarily storing data.

The HDD 22 serves as the content storing unit 1A in this example. The content storing unit 1A of the HDD 22 includes an area for recording main data (song data) and associated data of private content and an area for recording associated data of public content. As described below, public content becomes private content after the main data (song data) thereof has been obtained and stored in the content storing unit 1A. Thus, an area for storing main data of public content does not exist in the content storing unit 1A.

The CD/DVD drive 23 reads song data as main data and associated data of song content recorded on a CD or DVD loaded through the slot 7. The memory card drive 24 reads song data as main data and associated data of song content recorded on the memory card 5 loaded through the slot 8.

The read song data and associated data of the song content are stored in the content storing unit 1A of the HDD 22 under control by the control unit 20. Alternatively, the read song data of the song content is transferred to the audio controller 28, is supplied to a speaker 30 via an audio amplifier 29, and sound is reproduced through the speaker 30 under control by the control unit 20.

During storage of song content in the content storing unit 1A, the song data is compressed to data of an ATRAC3plus (adaptive transform acoustic coding 3 plus) format or an MP3 (MPEG audio layer III) format, and is then recorded while being associated with associated data. For example, identification information of the song content (a song content ID) is used for association. The data of the song content may be encoded at the same time.

Associated data of each piece of song content stored in the content storing unit 1A of the HDD 22 includes not only data stored in the CD, DVD, or memory card, but also data added in the audio apparatus 1 and data added by the user. Part of the associated data can be modified or changed by the user.

During playback of the song content stored in the content storing unit 1A of the HDD 22, song data of a piece of song content selected by the user from the stored song content is read, the read song data is decompressed in accordance with a compression format, and the decompressed song data is transmitted to the audio controller 28. The audio controller 28 transmits the song data to the amplifier 29, which converts the song data to an analog audio signal, and the analog audio signal is supplied to the speaker 30. Accordingly, the selected piece of song content to be played back is output from the speaker 30, so that a listener can listen to a desired song.

The network interface 25 connects to the content distributing server 2 via the network 3, and obtains associated data and song data as main data of song content from the content distributing server 2 via the network 3.

In this embodiment, during generation of a content list, which is used by a user to select and specify a piece of content, the audio apparatus 1 transmits a request to the content distributing server 2, obtains associated data about song content in a time range to be displayed on the list (range of dates of release), and stores the associated data in the content storing unit 1A. Accordingly, the list is displayed.

In the audio apparatus 1, after a piece of song content corresponding to the associated data obtained from the content distributing server 2 has been selected from the content list and instructions to purchase the piece of song content have been provided, song data as main data of the selected piece of song content is obtained from the distributing server 2, and the song data is stored in the content storing unit 1A while being associated with the associated data that has been obtained in advance. At this time, information for distinguishing public content from private content in the associated data is rewritten, so that the piece of public content obtained from the distributing server 2 is managed as private content.

In many cases, song data of distributed song content is compressed. Thus, the song data is decompressed in the above-described manner during playback and sound is output from the speaker 30 via the audio controller 28 and the amplifier 29.

The display unit 26 displays various data on the basis of control by the control unit 20. This is described in detail below. In the display unit 26, data to be displayed supplied to the display unit 26 via the system bus 21 is converted to a signal adaptable to a display device connected to a video controller 261 and is output under control by the video controller 261.

A content display unit 262 (the content display unit 11 shown in FIG. 2) displays thumbnails of pieces of content and associated data on a screen of the display device so that the user can easily search for and select a song.

A time axis bar display unit 263 includes the time axis bars TB1 and TB2 shown in FIG. 2 as display devices. The time axis bar display unit 263 receives data to be displayed from the video controller 261 and displays small thumbnails of many pieces of content in the time axis bars TB1 and TB2 in a time axis order, as described below.

In this embodiment, the time axis bar display unit 263 displays a list of all pieces of song content stored in the content storing unit 1A or many pieces of song content selected from the song content stored in the content storing unit 1A in the time axis bars TB1 and TB2 in the order of date of release. With this arrangement, the position of each piece of song content is clearly visible, so that a song can be easily searched for and selected.

The operation input unit 27 includes the operation button group 9 to accept an operation by the user, the selection dial 12, and the zoom dial 13. As described above, the operation button group 9 includes the playback/pause button 9A, the skip button 9B, the volume adjusting button 9C, the menu button 9G, and other various mode selecting buttons.

The selection dial 12 and the zoom dial 13 obtain an operation output according to a rotation angle or rotation number made by a dial operation (rotating operation) by the user from a rotary encoder and input the operation output to the CPU 20A via an input interface 271.

A dial operation performed on the selection dial 12 is an operation of changing a position on the time axis in the time axis bars TB1 and TB2 (or changing a selected piece of content). A dial operation performed on the zoom dial 13 is an operation of extending/narrowing the range of display dates in the time axis bars TB1 and TB2.

If the zoom dial 13 is turned in a direction to extend the range of display dates, the size of thumbnails of song content displayed in the time axis bars TB1 and TB2 in the time axis direction reduces, and a maximum number of thumbnails of song content displayed in the time axis bars TB1 and TB2 increases. On the other hand, if the zoom dial 13 is turned in a direction to narrow the range of display dates, the size of thumbnails of song content displayed in the time axis bars TB1 and TB2 in the time axis direction increases, and the maximum number of thumbnails of song content displayed in the time axis bars TB1 and TB2 decreases.

<Associated Data of Song Content>

Associated data of song content is data related to each piece of song content, such as a title and an artist name of the song content. As described above, the associated data is stored in the content storing unit 1A of the HDD 22 while being associated with a song content ID (identification data) of a corresponding piece of song content. In private content, song data as main data of the song content is stored while being applied with a song content ID. Thus, associated data of respective pieces of song content are associated with song data by song content IDs that are applied in common.

As described above, the associated data can be automatically obtained when content data of song content is read from a package medium. Alternatively, only the associated data can be obtained from the content distributing server. Also, associated data that is transmitted together with song data can be obtained at download of content data of song content. Furthermore, the user can additionally input associated data or edit obtained associated data by changing it.

In this embodiment, the associated data includes the items shown in FIG. 4.

(1) Song content ID: A code that can be uniquely identified in at least the audio apparatus 1.

(2) Access path: It indicates a source of song content. For example, an identification code such as ISRC (international standard recording code) may be used if the source is a medium such as a CD or DVD, whereas a URL (uniform resource locator) may be used if the song content is obtained via a network. This item is optional.

(3) Content file path: An access path of song data (main data) of the song content stored in the HDD 22.

(4) File name: The file name of the song content. It may be included in the content file path.

(5) Song title: The title or song name of the song content.

(6) Album name: The name of an album including the song content. Nothing is described if the song content is single.

(7) Artist name: The name of a singer, a player, a conductor, a songwriter, a composer, or an arranger.

(8) Duration of play (9) Jacket image data path: Access path to an image of a jacket photo or a file of a thumbnail thereof.

(10) Date of release: Date of announcement or sale of the song. It may be a date of purchase.

(11) Read/write attribute: The details are described below.

(12) Access permission information: It is optional. The details are described below.

(13) Test-listen data file path: It is optional. Access path to test-listen data of song content obtained from the content distributing server 2.

Among the above-described items of associated data, "song title", "album name", and "artist name" can be obtained from a CDDB (compact disc database) server via a network. In the "date of release", "year of issue" or "year of sale" can be obtained from the CDDB. However, when month and date are to be also recorded as the associated data, the year, month, and date of release printed on a package are input by the user through the operation button group 9 or manually input from a personal computer via the network interface 25.

"Duration of play" can be obtained from TOC (table of content) information in a package medium or the like. "Song content ID", "access path", "content file path", "file name", and "jacket image data path" are automatically or semi-automatically (partly through a manual operation) determined when content data of the song content is stored in the HDD 22.

<Read/Write Attribute>

In FIG. 4, as shown on the right side of the list of items of associated data, a "read/write attribute" is a read/write permission attribute to main data (song data) of song content.

The read/write attribute also has an attribute of "owner", "group", and "others", as shown in the figure.

"Owner" represents an owner of the audio apparatus 1 or the distributing server. In some cases, "owner" represents the audio apparatus 1 or the distributing server itself.

"Group" represents a plurality of owners (e.g., a family) of the audio apparatus 1 or a group of apparatuses assigned with the apparatus ID of the audio apparatus 1.

"Others" represents a person or apparatus other than the "owner" and "group".

In the read/write attribute, a read permission attribute (represented by "r" in FIG. 4) and a write permission attribute (represented by "w" in FIG. 4) can be set to the attribute of each of "owner", "group", and "others". Therefore, the read/write attribute includes six attributes.

Herein, "read" of the read permission attribute literally means read from a recording medium (the content storing unit 1A of the HDD 22 or the content storing unit 2A of the content distributing server 2). "Write" of the write permission attribute means move or deletion of content data of the song content.

Herein, the meaning of the attribute of "owner", "group", and "others" of the read/write attribute is for the owner of the song data and associated data of the song content. Note that the meaning is different for the owner or user of the audio apparatus 1, the owner of the content distributing server 2, and the owner of copyright of song data.

In this embodiment, each of the read permission attribute "r" and the write permission attribute "w" is data of 1 bit. "r=1" means that read is permitted, "r=0" means that read is not permitted, "w=1" means that write is permitted, and "w=0" means that write is not permitted.

Therefore, a value of the read/write attribute is represented by data of 6 bits. For example, as shown in the center of the right side in FIG. 4, if the value of the read/write attribute is "110000", the owner is permitted to read and write content data of the song content attached with this read/write attribute, but the group and others are not permitted. If the value of the read/write attribute is "111010", everyone is permitted to read, and only the owner is permitted to perform move and deletion.

That is, if both the read permission attribute "r" and the write permission attribute "w" are "1" in the owner attribute, the corresponding piece of song content is owned by the owner as private content.

On the other hand, in the read permission attribute "r" and the write permission attribute "w" of the owner attribute, if "r=0 and w=0" or if "r=1 and w=0", the corresponding piece of song content is public content.

Accordingly, the read/write attribute can be used as distinguishing information for distinguishing private content from public content.

When associated data is stored in the content storing unit 1A, information indicating whether main data is stored in the content storing unit 1A can be used as distinguishing information for distinguishing private content from public content. Alternatively, the read/write attribute together with information indicating whether main data is stored in the content storing unit 1A in a case where associated data is stored in the content storing unit 1A may be used as the distinguishing information.

The definition of "group" can be stored in part of the HDD 22 in the audio apparatus 1 on the user side and can be performed on entire song content stored in the audio apparatus 1. Alternatively, the definition of "group" can be provided in another field of the associated data and can be performed on respective pieces of the song content. The definition of "group" is the same in the distributing server, but is made by information indicating a set of group members.

The definition of "others" need not be specially recorded. "Others" is interpreted as people other than "owner" and "group", that is, "NOT owner" or "NOT group".

<Access Permission Information>

When the audio apparatus 1 is used by a plurality of users (e.g., members of a family), a user ID of a user who is permitted to access song content and a user ID of a user who is not permitted to access the song content are set as access permission information. For example, if there is a piece of song content which one can access and which should not be accessed by the other users, his/her user ID is set to a permitted user ID as access permission information of the piece of song content, and user IDs of the other members of family are set to a non-permitted user ID. Of course, access can be limited by using the group attribute of the above-described read/write attribute without using the access permission information.

By setting limits so that a user can search for a piece of song content in a distributing site but cannot transmit a request to purchase the piece of song content, it can be prevented that a user's child purchases song content without discretion.

The access permission information can be set for the entire content data of the song content stored in the apparatus, as the above-described group attribute. Alternatively, the access permission information can be set for each piece of song content by providing the information for each piece of associated data, as shown in FIG. 4.

<Example of Display of Content List>

FIG. 5 is a functional block diagram mainly showing function processing units of the control unit 20 to display a content list. As described above, in this example, a list is displayed by arranging thumbnails of pieces of song content in the order of date of release within a specified range of period, the date of release of each piece of song content being used as a search key attribute.

In this embodiment, the content storing unit 1A of the HDD 22 includes a main data (song data) accumulating unit 1Aa and an associated data accumulating unit 1Ab. The control unit 20 includes, as the function processing units for displaying a content list, a content associated data managing unit 201, a content main data managing unit 202, a display condition setting unit 203, a display arranging unit 204, and a public content data obtaining unit 205.

The content associated data managing unit 201 manages associated data accumulated in the associated data accumulating unit 1Ab of the content storing unit 1A and has a function of reading and writing the associated data.

The content main data managing unit 202 manages song data as main data of song content accumulated in the main data accumulating unit 1Aa of the content storing unit 1A and has a function of reading and writing the song data.

The display condition setting unit 203 sets a display condition of a content list in accordance with an operation input by a user through the operation button group 9, the selection dial 12, or the zoom dial 13 in the operation input unit 27, and supplies the set condition to the display arranging unit 204.

The display condition set here includes, as described below, a range of period (a range of dates) within which pieces of content are listed in the order of date of release as a search key attribute, information about a position of a focus cursor, and a mode condition including a mode of displaying a content list of only private content (hereinafter referred to as a private mode) and a mode of displaying a content list of private content and public content (hereinafter referred to as a mixed mode).

The display arranging unit 204 supplies information about a range of display period to the content associated data managing unit 201 on the basis of the display condition received from the display condition setting unit 203, and requests associated data necessary for displaying a content list.

The content associated data managing unit 201 receives the information about the display condition (information about the range of display period) from the display arranging unit 204, reads associated data necessary for displaying the content list, such as data of thumbnails of song content released in the range of the display period, and supplies the read data to the display arranging unit 204.

In this embodiment, the associated data accumulating unit 1Ab stores information about thumbnails created by using image information, such as jacket photos of private content and public content, in the form of a thumbnail file.

The content associated data managing unit 201 reads and obtains thumbnails of respective pieces of music content required for displaying a content list from the thumbnail file stored in the associated data accumulating unit 1Ab by referring to the above-described jacket image data path in the associated data, and supplies the obtained thumbnails to the display arranging unit 204.

The content associated data managing unit 201 also reads other associated data than the thumbnails, such as titles and dates of release to be displayed on the content list, from the associated data accumulating unit 1Ab and supplies the read data to the display arranging unit 204.

The thumbnails of respective pieces of song content are created at the time of obtaining associated data of the song content through the CD/DVD drive 23, the memory card drive 24, or the network interface 25 and storing the associated data in the associated data accumulating unit 1Ab, and the created thumbnails are stored in the associated data accumulating unit 1Ab.

Of course, the thumbnails may be created by accessing the jacket image file of the song content stored in the associated data accumulating unit 1Ab at a process of displaying the content list. If data of the thumbnails is included in the associated data, the data of the thumbnails is used.

When the display mode of the content list is set to the mixed mode, the display arranging unit 204 instructs the public content data obtaining unit 205 to obtain associated data of public content at an appropriate timing, e.g., at initial display of the content list or at change of the range of display period.

In response to the instructions from the display arranging unit 204, the public content data obtaining unit 205 accesses the content distributing server 2 via the network interface 25 in order to obtain the associated data of the public content, and then supplies the obtained associated data to the content associated data managing unit 201.

The content associated data managing unit 201 receives the associated data from the public content associated data obtaining unit 205 and stores the associated data in the associated data accumulating unit 1Ab.

Although not shown in FIG. 5, when the content associated data managing unit 201 obtains associated data together with main data from the CD/DVD drive 23 or the memory card drive 24, the content associated data managing unit 201 stores the obtained associated data in the associated data accumulating unit 1Ab.

When storing the associated data, the content associated data managing unit 201 performs control so that the same associated data of music content as the associated data of music content (public content and private content) that has already been accumulated in the associated data accumulating unit 1Ab is not redundantly accumulated.

In order to avoid overlaps of associated data in the associated data accumulating unit 1Ab, a method of abandoning new associated data is preferably used, because part of the accumulated associated data can be added or modified by a user, and the addition and modification should be maintained. However, when main data is newly stored as private content, for example, the associated data stored in the associated data accumulating unit 1Ab may be updated with newly obtained associated data.

When associated data of private content is obtained, determination of overlap of associated data may be made only on the associated data of private content. When associated data of public content is obtained, determination of overlap of associated data may be made only on the associated data of public content.

The display arranging unit 204 includes a content display unit arranging unit 2041 and a time axis bar arranging unit 2042, generates display information of a content list according to information of a display condition supplied from the display condition setting unit 203 by using the associated data obtained from the content associated data managing unit 201, and supplies the generated display information to the display unit 26.

The time axis bar arranging unit 2042 generates image information of the content list to be displayed on the content display unit 11 by using the display condition supplied from the display condition setting unit 203, the thumbnail data supplied from the content associated data managing unit 201, and other data, and supplies the generated image information to the display unit 26, so that the image information is displayed in the time axis bars TB1 and TB2.

In this example, the time axis bar arranging unit 2042 generates information to be displayed in the time axis bars TB1 and TB2, that is, image information of the content list listing small thumbnails of music content arranged in the time order of the date of release within the set range of period, by using the date of release of the music content as a search key attribute.

Furthermore, in this example, the time axis bar arranging unit 2042 refers to the above-described read/write attribute in the associated data in order to determine whether each piece of song content is public content or private content, and displays thumbnails of private content in color and thumbnails of public content in monochrome so that the user can visually distinguish the both types of content from each other.

The method for enabling the user to visually distinguish public content from private content is not limited to the method of displaying the thumbnails in color and monochrome. For example, thumbnails of different sizes or shapes may be used. Specifically, the thumbnails of private content may be larger than those of public content. Alternatively, the shape of the thumbnails of public content may be square, whereas the shape of the thumbnails of private content may be hexagon. Also, modifications applied to the thumbnails may be changed.

Alternatively, grayscale display or grayout display may be adopted. Alternatively, the thumbnails of private content may be surrounded by a bold frame, and those of public content may be surrounded by nothing. In this way, various modifications can be adopted.

Likewise, the content display unit arranging unit 2041 generates image information of the content list to be displayed in the content display unit 11 by using the display condition supplied from the display condition setting unit 203, the thumbnail data supplied from the content associated data managing unit 201, and other data, and supplies the generated image information to the display unit 26. In this embodiment, the content list displayed in the content display unit 11 is a list of thumbnails of pieces of content near a focus cursor in the time axis bars TB1 and TB2.

That is, the content display unit arranging unit 2041 displays enlarged thumbnails of part of content near the focus cursor among the small thumbnails in the content list displayed in the time axis bars TB1 and TB2, and also displays details of associated information, such as titles of content.

As described above, the time axis bar arranging unit 2042 displays smaller thumbnails than those displayed in the content display unit 11 in the time axis bars TB1 and TB2. For this purpose, in this embodiment, the smaller thumbnails are also generated and are stored in the thumbnail file in the associated data accumulating unit 1Ab. The time axis bar arranging unit 2042 performs display in the time axis bars TB1 and TB2 by using the smaller thumbnails supplied from the associated data accumulating unit 1Ab.

The smaller thumbnails may not be included in the thumbnail file in the associated data accumulating unit 1Ab. In that case, the smaller thumbnails may be generated in the time axis bar arranging unit 2042 on the basis of the obtained thumbnails for the content display unit 11.

In this embodiment, if a specific piece of song content is focused on in the content display unit 11, a predetermined part of the song data of the piece, such as a head or climax, is played back, which helps the user to determine which song is currently selected.

Accordingly, in this embodiment, the display arranging unit 204 supplies information of a song content ID of the piece of song content selected by a focus cursor and information of a content file path or information of test-listen data file path to the content main data managing unit 202.

If the piece of song content identified by the song content ID received from the display arranging unit 204 is private content, the content main data managing unit 202 reads the predetermined part of the main data (song data) indicated by the content file path from the main data accumulating unit 1Aa and transmits the part to the audio controller 28 so that the predetermined part is played back.

In this embodiment, if test-listen data exists in the public content obtained from the content distributing server 2, the public content data obtaining unit 205 obtains the test-listen data at the same time of obtaining the associated data thereof and supplies the test-listen data to the content main data managing unit 202. The content main data managing unit 202 stores the received test-listen data in a test-listen data storing area of the main data accumulating unit 1Aa while associating it with a song content ID.

If the piece of song content identified by the song content ID received from the display arranging unit 204 is public content, the content main data managing unit 202 reads test-listen data of the piece of song content from the test-listen data storing area indicated by the test-listen data file path in the test-listen data storing area in the main data accumulating unit 1Aa and supplies the test-listen data to the audio controller 28. Accordingly, the test-listen data is played back through the speaker 30.

If a purchase request is input by the user through the operation input unit 27 during playback of the test-listen data, the purchase request is transmitted to the content main data managing unit 202 via the display condition setting unit 203 and the display arranging unit 204.

Upon receiving the purchase request, the content main data managing unit 202 transmits a request for obtaining main data of the currently listened public content to the public content data obtaining unit 205. Accordingly, the public content data obtaining unit 205 transmits a request for obtaining main data of the song content to the content distributing server 2 via the network interface 25 in order to obtain the main data, and transmits the main data to the content main data managing unit 202.

After receiving the main data of the public content, the content main data managing unit 202 stores the main data in the main data accumulating unit 1Aa while associating the main data with the song content ID, and notifies the content associated data managing unit 201 of the storage.

The content associated data managing unit 201 receives the notification and rewrites the read/write attribute in the associated data of the song content from public content to private content. That is, the owner attribute of the read/write attribute is rewritten from "10" to "11".

Accordingly the song content that was public content is managed as private content in the audio apparatus 1.

If the selected piece of public content does not have test-listen data, the presence/absence of the test-listen data being determined on the basis of the presence/absence of the test-listen data file path in the associated data, the display arranging unit 204 does not transmit the corresponding song content ID to the content main data managing unit 202, but allows the content display unit 11 to display a mark, characters, or icon representing "no test-listen data", so as to notify the user of it.

<Example of Display of Content List>

Figure 6:
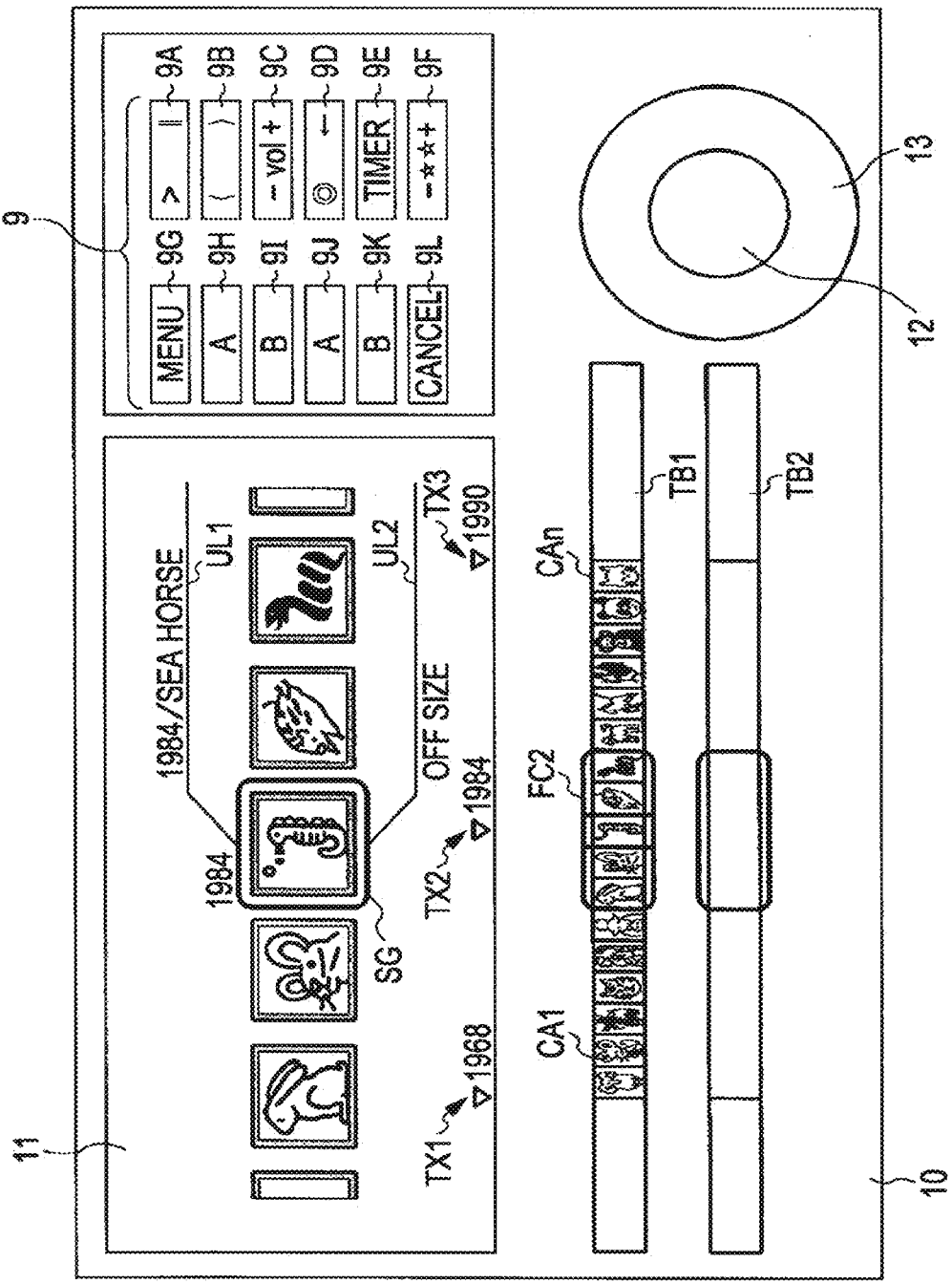
FIG. 6 illustrates an example of display on a front panel of the audio apparatus according to the embodiment.

FIG. 6 shows an example of display of a content list. The example shown in FIG. 6 shows the private mode. As described above, the front panel 10 of the audio apparatus 1 according to this embodiment is provided with the content display unit 11 and the time axis bars TB1 and TB2.

In the associated data accumulating unit 1Ab of the content storing unit 1A of the HDD 22, information about a date of sale of each piece of song content is recoded in a "date of release" field of associated data of the piece of song content.

In the example shown in FIG. 6, the private mode is set by the user, and thus the control unit 20 reads the associated data of only private content from the associated data accumulating unit 1Ab of the HDD 22. Whether the associated data belongs to private content can be determined by referring to the read/write attribute of the associated data. Alternatively, a determination of whether content is private content can be made by determining whether the main data having the same song content ID as that of the associated data exists in the content storing unit 1A.

The control unit 20 obtains thumbnails of pieces of the private content on the basis of the associated data of the private content read from the associated data accumulating unit 1Ab of the content storing unit 1A, and arranges (sorts) small thumbnails of the thumbnails in the time axis bar TB1 in the order of the date of release, that is, in the order of the date of sale in this example. In this embodiment, thumbnails of the private content are displayed in color.

In this embodiment, the time axis bar TB2 is not used in the private mode. If there are pieces of content having the same date of release, those pieces of content are further sorted on the basis of another attribute, such as a title.

Accordingly, small thumbnails of the pieces of private content owned by the user are arranged in the time axis bar TB1 in the order of date of sale.

Only "the year of release" may be recorded in the "date of release" field of the associated data. In that case, the thumbnails may be sorted by applying the first day (January 1) or the last day (December 31) of the year or a random date (this is not recorded in the associated data).

The number of displayable thumbnails is determined depending on the display ability (resolution) of the time axis bar TB1. If the display ability is poor, rectangles or line segments drawn with colors of high distribution among dot colors constituting the thumbnails may be displayed instead of the thumbnails.

If many of the pieces of song content stored in the content storing unit 1A are to be displayed, only the pieces of song content that can be displayed on the time axis bar TB1 may be displayed in the list. Alternatively, the pieces of song content to be displayed may be reduced by increasing the search key attribute for displaying the list, for example, by adding a genre to the time attribute of date of release as the search key attribute.

In the time axis bar TB1 shown in FIG. 6, thumbnails of n pieces of song content: song content pieces CA1 to CAn, are displayed in a specified range of display dates.

A triangle mark TX1, indicating a start point of the range of display dates corresponding to the time axis bar TB1 at a lower part of the content display unit 11, indicates that the year of release of the song content piece CA1 at the start point of the specified range of display dates is 1968. Also, a triangle mark TX3, indicating an end point of the range of display dates corresponding to the time axis bar TB1 at the lower part of the content display unit 11, indicates that the year of release of the song content piece CAn at the end point of the specified range of display dates is 1990.

A triangle mark TX2 indicates a position of a date of release of a song content piece that is currently focused on in the time axis bar TB1, and moves in accordance with the movement of a focus cursor frame FC2 (described below) on the time axis bar TB1. The date of release of the song content piece that is currently focused on is displayed on the right side of the triangle mark TX2.

In FIG. 6, thumbnails are displayed in the time axis bar TB1 without gaps therebetween, which implies that the time axis between the triangle marks TX1 and TX3 is not linearly positioned. Of course, the time axis may be linearly positioned, that is, a width corresponding to one year may be uniformly displayed, and the display positions of the thumbnails on the time axis bar TB1 may be determined by associating them to the time axis.

Several thumbnails are displayed in the content display unit 11 with a size, resolution, and color of higher visibility than that in the time axis bar TB1. In FIG. 6, five thumbnails are displayed. The five thumbnails in the content display unit 11 are displayed in conjunction with the thumbnails of pieces of song content specified by the cursor frame FC2, which indicates a focused position on the time axis bar TB1.

The cursor frame FC2 focuses a width corresponding to five thumbnails, and also focuses the center thumbnail in the five thumbnails as a currently-selected piece of song content. The five thumbnails focused by the cursor frame FC2 are displayed in the content display unit 11 with a size, resolution, and color of higher visibility than that in the time axis bar TB1.

This cursor frame FC2 can be horizontally moved by turning the selection dial 12 clockwise or counterclockwise. In accordance with a turn of the selection dial 12, the five thumbnails displayed in the content display unit 11 are horizontally scrolled. In other words, the inside of the cursor frame FC2 is a miniature of the content display unit 11.

In the content display unit 11, a cursor frame FC1 is further displayed for the center thumbnail among the five thumbnails displayed in the content display unit 11. The cursor frame FC1 indicates a currently focused piece of song content.

In the content display unit 11, the year of release and the title of the focused piece of song content are displayed in a display space UL1 and the artist name thereof is displayed in a display space UL2. Of course, if the year, month, and date of release are recorded in the "date of release" field of the associated data, the year, month, and date of release may be displayed in the display space UL1. Then, part of song data of the focused piece of song content is played back, so that the user can recognize the focused piece of song content.

If a predetermined user operation is performed, more specifically, if the selection dial 12 is pressed to the front panel 10 or the operation button 9A is pressed under a state where the specific piece of song content is specified by the cursor frame FC1, the operation causes instructions to play back the piece of song content focused by the focus frame FC1. Accordingly, the control unit 20 sequentially reads the song data as main data of the piece of song content from the content storing unit 1A from the top, and plays back the piece of song content.

In the content display unit 11, the position of the cursor frame FC1 is fixed at the center. If the selection dial 12 is turned and the position of the cursor frame FC2 changes in the time axis bar TB1, the thumbnails of five pieces of song content displayed in the content display unit 11 are scrolled in the direction opposite to the movement direction of the cursor frame FC2, so that the thumbnail focused by the focus frame FC1 changes.

As described above, FIG. 6 shows display of content in the private mode, which is a mode of displaying a list of pieces of song content whose main data and associated data are stored in the content storing unit 1A. In this embodiment, pieces of song content stored in a CD or DVD loaded in the CD/DVD drive 23 of the audio apparatus 1 or pieces of song content stored in a memory card loaded in the memory card drive at the time are also targets to be displayed in the list.

Also, the private mode is a mode enabling a user (owner of the content) to display a list of songs filtered on the basis of a genre or the like.

In the private mode, all pieces of song content displayed in the content display unit 11 and the time axis bar TB1 are private content, and the thumbnails thereof are displayed in color. In the figures, colors are not actually shown, but color display is expressed by a shaded double frame around each thumbnail.

FIGS. 7A and 7B expressly show the color display. FIG. 7A shows a list of thumbnails of pieces of song content displayed in the content display unit 11 shown in FIG. 6. FIG. 7B shows a list of thumbnails in the time axis bar TB1 shown in FIG. 6.

As shown in FIG. 7A, a plurality of (five) thumbnails having a favorable visibility are displayed in color in the content display unit 11. Also, as shown in FIG. 7B, the five thumbnails and other thumbnails of pieces of song content arranged in the order of date of release are displayed in color in a smaller size in the time axis bar TB1.

Hereinafter, display of a content list in the mixed mode is described. The mixed mode is a mode of displaying a list of both private content and public content.

As described above, the private content is content stored in the content storing unit 1A of the audio apparatus 1 or song content stored in a medium loaded into the CD/DVD drive 23 or the memory card drive 24. In other words, the private content is content owned by a user.

The public content is content stored in the content storing unit 2A of the content distributing server 2. The user can access the associated data of the public content.

In this embodiment, in order to display a list in the mixed mode, associated data of public content is stored in the content storing unit 1A and then thumbnails of pieces of the public content are displayed. Instead of storing the associated data in the content storing unit 1A, the associated data obtained from the distributing server may be stored in the work area RAM 20C so as to be used for displaying a list. Therefore, storage of associated data of public content in the content storing unit 1A of the audio apparatus 1 is not a requirement of public content.

Figure 8A:
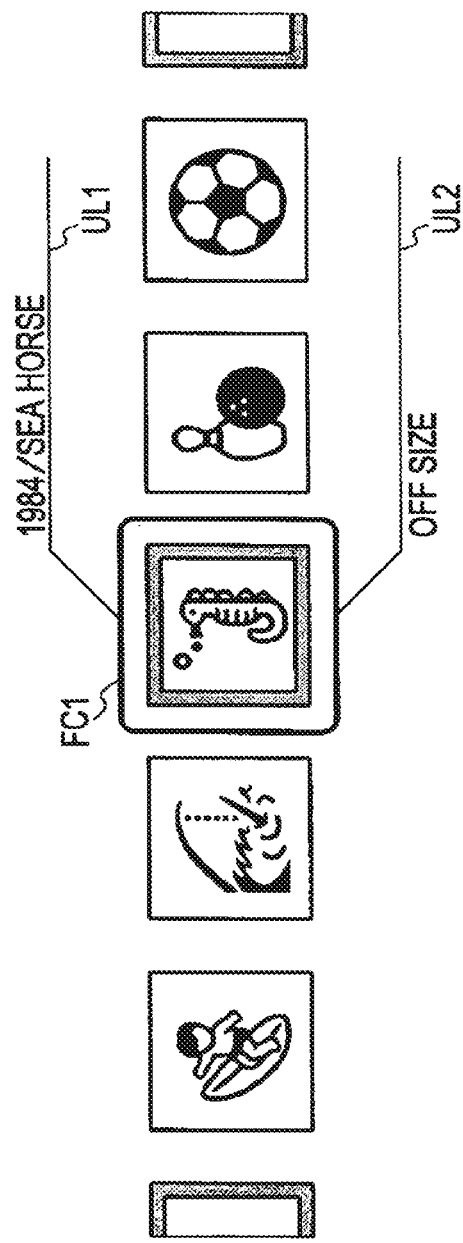
FIGS. 8A and 8B illustrate an example of display of a content list according to the embodiment of the present invention.
Figure 8B:
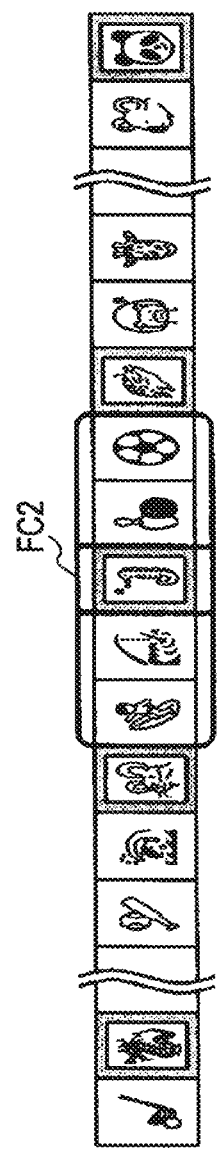

FIGS. 8A and 8B show an example of a content list displayed in the mixed mode. FIG. 8A shows an example in the content display unit 11, and FIG. 8B shows an example in the time axis bar TB1.

In the mixed mode, a form of displaying thumbnails of private content is different from that of public content so that private content can be easily distinguished from public content, as described above. In this embodiment, thumbnails of private content are displayed in color, whereas thumbnails of public content are displayed in monochrome. In FIGS. 8A and 8B, color thumbnails are shown with a shaded double frame as in FIGS. 7A and 7B, whereas monochrome thumbnails are shown with a singe frame.

Figure 9A:
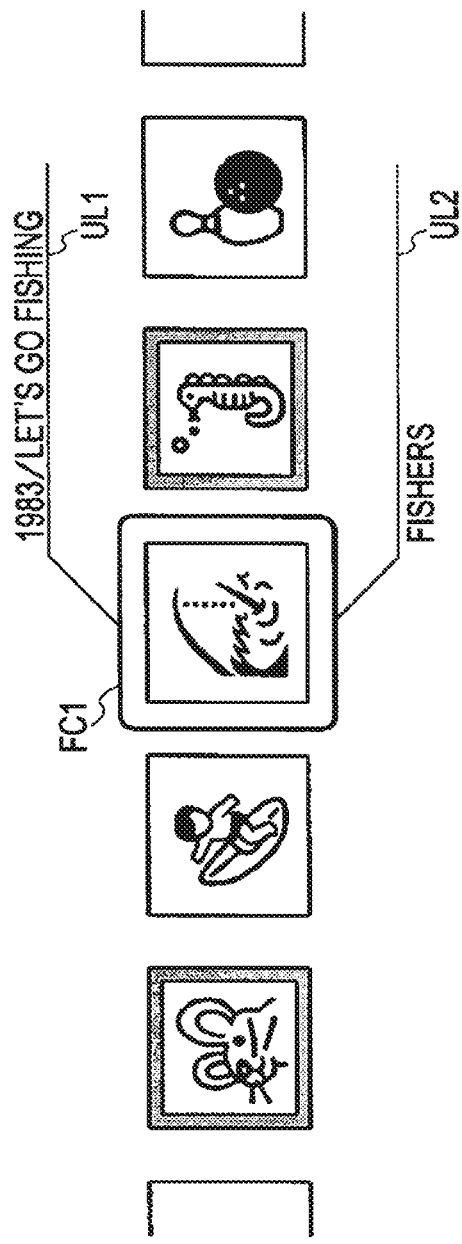
FIGS. 9A and 9B illustrate an example of display of a content list according to the embodiment of the present invention.

As described above, if the cursor frame FC2 on the time axis bar TB1 is moved to the left in the state shown in FIG. 8B, the thumbnails are scrolled to the right, with the focus cursor frame FC1 in the content display unit 11 being kept at the center, as shown in FIG. 9A. The scrolling causes a change of the thumbnail of a focused piece of song content. Accordingly, the associated data displayed in the display spaces UL1 and UL2 also changes at the same time.

Figure 9B:
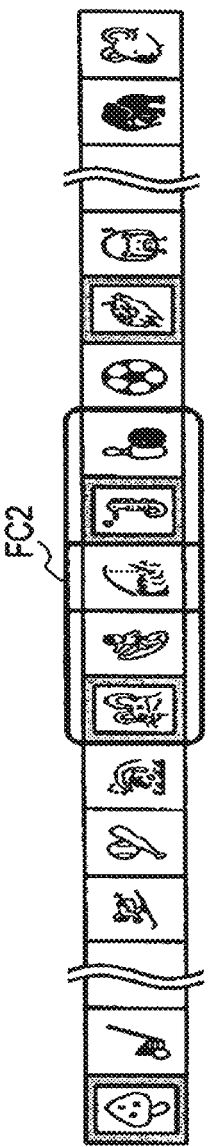

In the example shown in FIGS. 9A and 9B, the thumbnail of the newly focused piece of song content is displayed in monochrome, and thus the user can recognize that the piece of song content is public content. At this time, only the associated data has been obtained about the public content, and thus the title and artist name thereof can be displayed as shown in FIG. 9A.

When the focused piece of song content is public content, a request for performing test-listen and then purchasing it may be typically generated. In this embodiment, if the focused piece of song content is public content and if the focused piece has test-listen data, the test-listen data is read from a data file in the main data accumulating unit 1Aa and is output from the speaker 30, so as to be provided to the user.

If test-listen data exists when associated data of public content is obtained, the test-listen data may not be obtained at the time and stored in the test-listen data storing area of the main data accumulating unit 1Aa. In that case, when a piece of public content is focused by the focus cursor frame FC1 in the content display unit 11, a request command of requesting distribution of test-listen data of the focused piece of public content may be transmitted to the content distributing server 2, so that the content distributing server 2 may receive the request command and transmit the test-listen data to the audio apparatus 1.

In a case where a "test-listen data" field indicating presence/absence of test-listen data is provided in the associated data of obtained public content, if it can be determined that the "test-listen data" is prepared in the distributing server at the time when the associated data is obtained, a "test-listen" icon indicating existence of the test-listen data may be displayed at a part of the content display unit 11, e.g., near the display space UL1, at the same time when the piece of public content is focused on in the content display unit 11. Then, a request command of requesting the test-listen data may be transmitted upon press on the operation button 9H by the user.

Furthermore, even when the "test-listen data" field is not provided in the associated data of the public content, a query command of querying whether the test-listen data is prepared may be transmitted to the content distributing server 2 via the network interface 25 at the timing when a piece of public content is focused, and the "test-listen" icon may be displayed at a predetermined position of the content display unit 11 upon reception of a response saying that the test-listen data can be transmitted from the content distributing server 2.

As described above, the received test-listen data is stored in the content storing unit 1A of the HDD 22, and the access path thereof is recorded in the "test-listen data" field of the associated data. Accordingly, the test-listen data can be quickly played back if the corresponding piece of public content is focused on next time.

After the test-listen, the user presses the operation button 9I if the user wants to purchase the song. Accordingly, a purchase command is transmitted to the distributing server from the audio apparatus 1 together with a user ID (user identifier) or an apparatus ID (apparatus identifier). Upon completion of user authentication, normal song data and associated data of the piece of song content are distributed.

The audio apparatus 1 receives the distributed data, stores the song data in the main data accumulating unit 1Aa of the content storing unit 1A of the HDD 22, generates the associated data as shown in FIG. 4, stores the associated data in the associated data accumulating unit 1Ab of the content storing unit 1A, and deletes the test-listen data and the associated data that have been stored therein.

Also, the monochrome thumbnail displayed in the content display unit 11 and the time axis bar TB1 is replaced by a color thumbnail. That is, the purchased song data is dealt with as private content thereafter.

Figure 10A:
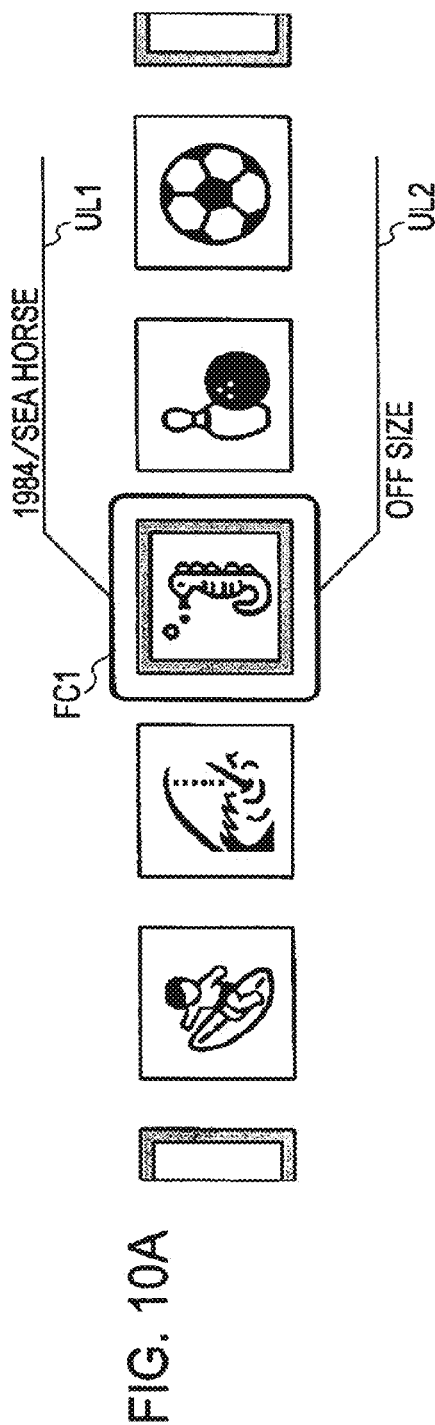
FIGS. 10A, 10B, and 10C illustrate an example of display of a content list according to the embodiment of the present invention.
Figure 10B:
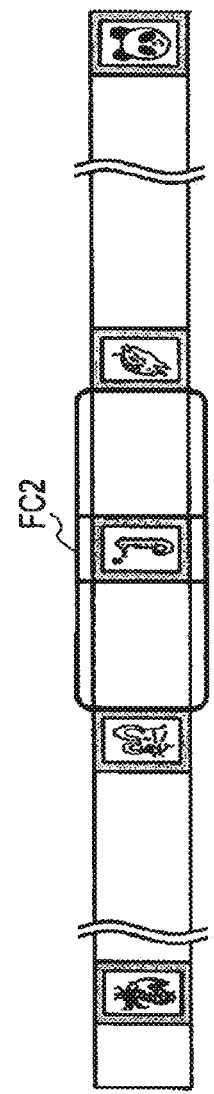
Figure 10C:
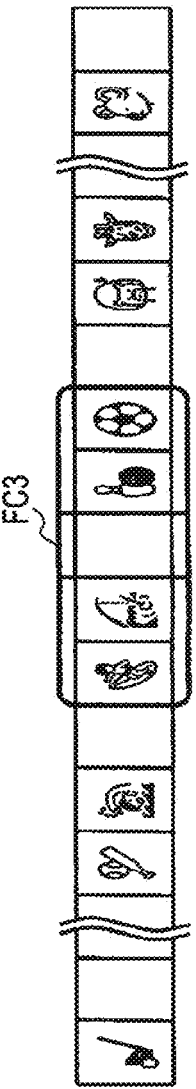

FIGS. 10A to 10C show another example of display of content in the mixed mode. In the example shown in FIGS. 10A to 10C, a list of private content and a list of public content are individually displayed in the two time axis bars TB1 and TB2.

FIG. 10A shows an example of display in the content display unit 11. This is totally the same as in the case where content is displayed in the mixed mode by using only the time axis bar TB1, as described above with reference to FIGS. 8A to 9B.

However, in this example of display of content in the mixed mode, thumbnails of only private content are displayed in the time axis bar TB1 as shown in FIG. 10B, and thumbnails of only public content are displayed in the time axis bar TB2, as shown in FIG. 10C.

As in the above-described example, thumbnails of private content in the time axis bar TB1 are displayed in color, whereas thumbnails of public content in the time axis bar TB2 are displayed in monochrome.

In this example, as shown in FIGS. 10B and 10C, thumbnails are displayed in one of the time axis bars TB1 and TB2 at the same time axis positions, so that the respective time axis positions are clear between private content and public content. In FIGS. 10B and 10C, a space where no picture is displayed in the time axis bars TB1 and TB2 indicates that no content exists.

In this case, the cursor frame FC2 that is additionally displayed on the time axis bar TB1 and a cursor frame FC3 that is additionally displayed on the time axis bar TB2 are horizontally moved in perfect synchronization with each other in accordance with a turn of the selection dial 12.

According to the example shown in FIGS. 10A to 10C, private content and public content are displayed in different time axis bars in the mixed mode, and thus the both types of content can be distinguished from each other more clearly.

In the example shown in FIGS. 10A to 10C, private content is displayed in the time axis bar TB1 and public content is displayed in the time axis bar TB2. Alternatively, public content may be displayed in the time axis bar TB1 and private content may be displayed in the time axis bar TB2.

In the example shown in FIGS. 10A to 10C, too, private content is displayed in color and public content is displayed in monochrome. However, both private content and public content may be displayed in color or monochrome.

<Operation Flow of Mixed Mode>

Hereinafter, an operation of the control unit 20 of the audio apparatus 1 in the above-described mixed mode is described with reference to the flowchart shown in FIGS. 11 to 13.

First, the control unit 20 reads a preset initial value, that is, a range of display dates or a range of display dates at the end of a previous display of a content list, from the HDD 22 (step S101).

Herein, at purchase of the audio apparatus 1, no content data of song content is stored in the content storing unit 1A of the HDD 22, and thus the initial value is arbitrarily set, for example, "from Jan. 1, 1950 to Dec. 31, 2010".

After purchase of the audio apparatus 1, content data of song content is stored as private content in the content storing unit 1A of the HDD 22. Until the total of the number of pieces of associated data of the private content and the number of pieces of associated data of public content obtained from the content distributing server 2 exceeds a maximum number of songs that can be displayed in the time axis bar TB1, for example, 40, the range of display dates may be updated in accordance with the oldest and newest dates of release of the song content. In accordance with the update of the range, the start point TX1 and the end point TX3 of the range of display dates on the time axis bars TB1 and TB2 are updated.

If the total number exceeds the maximum number of pieces of content that can be displayed in the time axis bars TB1 and TB2, songs in an arbitrary range in the range of display dates are selected and displayed. Furthermore, if the maximum number of pieces of content that can be displayed in the list in the time axis bars TB1 and TB2 is to be increased or decreased, the range of dates can be changed by operating the zoom dial 13, as described above. Of course, it becomes difficult to display thumbnails if the maximum number is increased. In that case, pieces of song content are displayed in the time axis bars TB1 and TB2 in a simplified form, such as rectangles or line segments, instead of thumbnails.

After step S101, the control unit 20 asks the content distributing server 2 to transmit associated data in the specified range of display dates, associates the received associated data of respective pieces of song content with respective song content IDs, and stores the associated data in the associated data accumulating unit 1Ab of the content storing unit 1A of the HDD 22 (step S102).

At this time, the fields of "content file path" and "file name" of associated data of public content whose main data has not yet been stored are blank. The blank fields indirectly indicate that the song content is public content.

Then, the control unit 20 checks whether the associated data that matches the received associated data in "song title", "album name", "artist name", "date of release", and so on has already been stored. If such associated data has already been stored, the above-described deleting process is performed on the received associated data of song content (step S103).

Then, the control unit 20 reads all "date of release" fields of the associated data of the public content and private content stored in the associated data accumulating unit 1Ab of the content storing unit 1A of the HDD 22, and sorts the read data in the order of date (step S104).

Herein, it is inefficient to perform the sorting process every time on all of the associated data stored in the associated data accumulating unit 1Ab. Thus, it is desirable to perform sorting in the order of date every time song data and associated data of song content are stored and updated, update a sort list as a result of the sorting, and store the list in the HDD 22.

The sorting process may be performed on only the associated data of the song content in a specified range of display dates. However, if the selection dial 12 and the zoom dial 13 are frequently used, the sorting process is performed every time the range is changed. Thus, whether the sorting is to be performed on associated data of all pieces of song content or only a specified range of song content may be determined in accordance with the ability of resources, such as the CPU 20A of the control unit 20, the HDD 22, or a response speed of a network or the content distributing server 2.

Then, the control unit 20 reads image data in accordance with the content in the "jacket image data path" field of the associated data in the range of display dates among the associated data of the sorted song content, generates small thumbnails, and displays the thumbnails in the time axis bar TB1. At this time, the small thumbnails of public song content are displayed in monochrome and the small thumbnails of private song content are displayed in color (step S105).

As described above, the small thumbnails may be generated and stored in the HDD 22 in advance. In that case, the access path thereof is recorded in the associated data so that the corresponding small thumbnails can be read.

Then, the control unit 20 reads a current position and width (range of dates) of the cursor frame FC2 on the time axis bar TB1, reads associated data corresponding to the pieces of song content indicated by the cursor frame FC2, and displays thumbnails of the pieces in the content display unit 11 in an enlarged size. In the content display unit 11, too, thumbnails of public song content are displayed in monochrome, whereas thumbnails of private song content are displayed in color (step S106).

Then, the control unit 20 additionally displays the focus cursor frame FC1 on the thumbnail of the piece of song content displayed in the center of the content display unit 11, as shown in FIG. 8A. Then, the control unit 20 reads the associated data of the focused piece of song content, and displays "year of release" and "title" in the display space UL1 and "artist name" in the display space UL2 (step S107).

Figure 12:
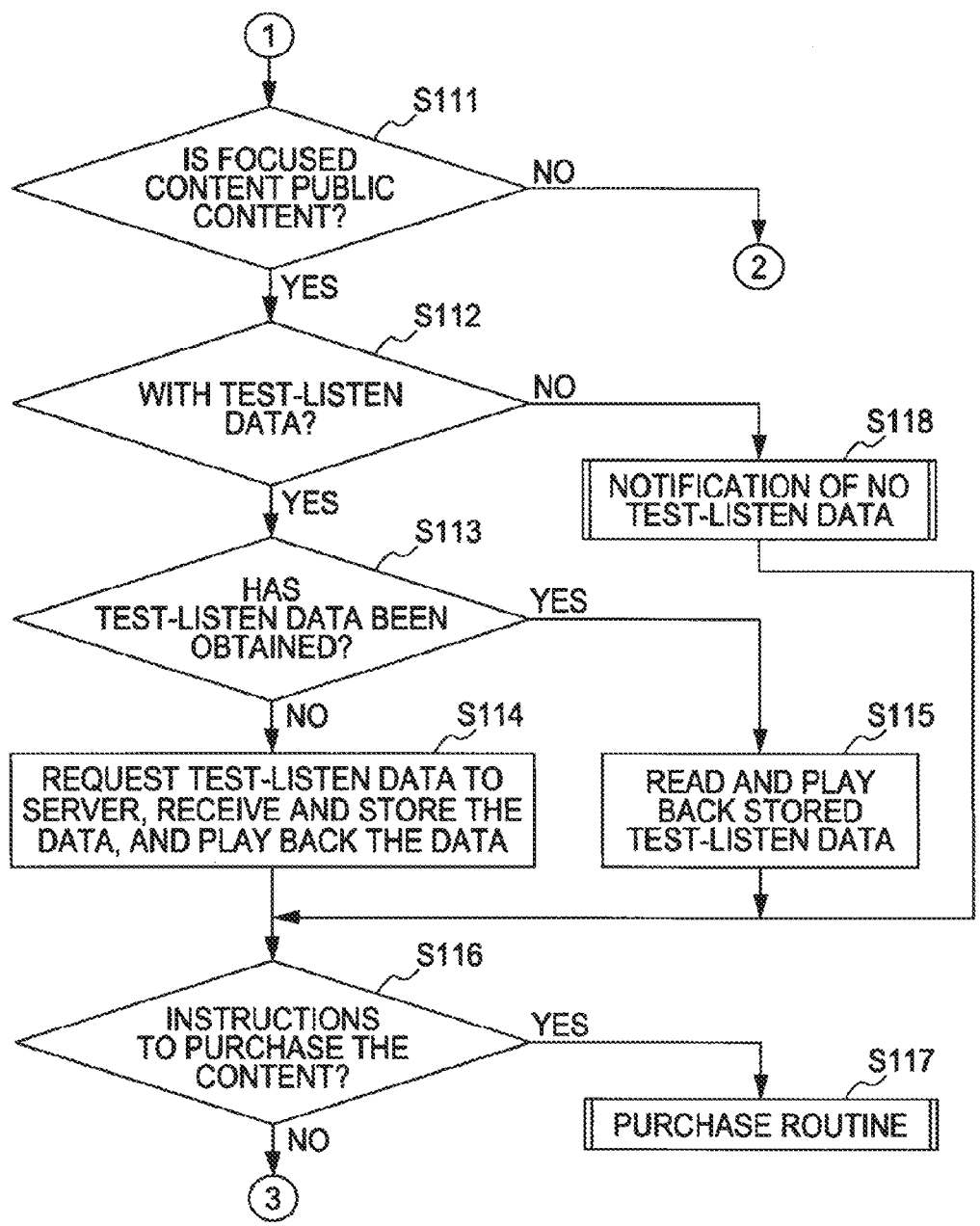
FIG. 12 shows part of the flowchart illustrating the example of the content list display process according to the embodiment of the present invention.

Then, the control unit 20 determines whether the focused piece of song content is public content (step S111 in FIG. 12). If determining that the focused piece is public content, the control unit 20 determines whether test-listen data exists (step S112).

If determining that test-listen data exists, the control unit 20 determines whether the test-listen data has been obtained (step S113). If the test-listen data has not been obtained, the control unit 20 requests the test-listen data of the piece of song content to the content distributing server 2 in order to obtain the test-listen data, stores the obtained test-listen data in the test-listen data storing unit of the content storing unit 1A, and plays back the test-listen data, which is output from the speaker 30 (step S114).

If determining in step S113 that the test-listen data has been obtained, the control unit 20 reads the test-listen data that is stored in the test-listen data storing unit of the content storing unit 1A and plays back the test-listen data, which is output from the speaker 30 (step S115).

If determining in step S112 that the focused piece of public content does not have test-listen data, the control unit 20 displays a notification for the user that there is no test-listen data in the content display unit 11, although not shown (step S118). At this time, a voice message "There is no test-listen data" may be output from the speaker 30.

After step S114, S115, or S118, the control unit 20 determines whether the user has provided instructions to purchase the piece of public content (step S116). If the instructions to purchase the piece of public content have been provided, the control unit 20 executes a purchase routine of the piece of public content to the content distributing server 2 (step S117).

In this purchase routine, the control unit 20 checks the associated data of the piece of song content to be purchased, and transmits a command to request purchase of the content data of the piece of song content to the content distributing server 2 on the basis of the "access path". After receiving the content data, the control unit 20 stores the content data in the content storing unit 1A of the HDD 22, generates associated data of this piece of song content as private content, and deletes the associated data of this piece of song content as public content. Also, the control unit 20 may provide instructions to play back the received song data to the audio controller 28.

Figure 13:
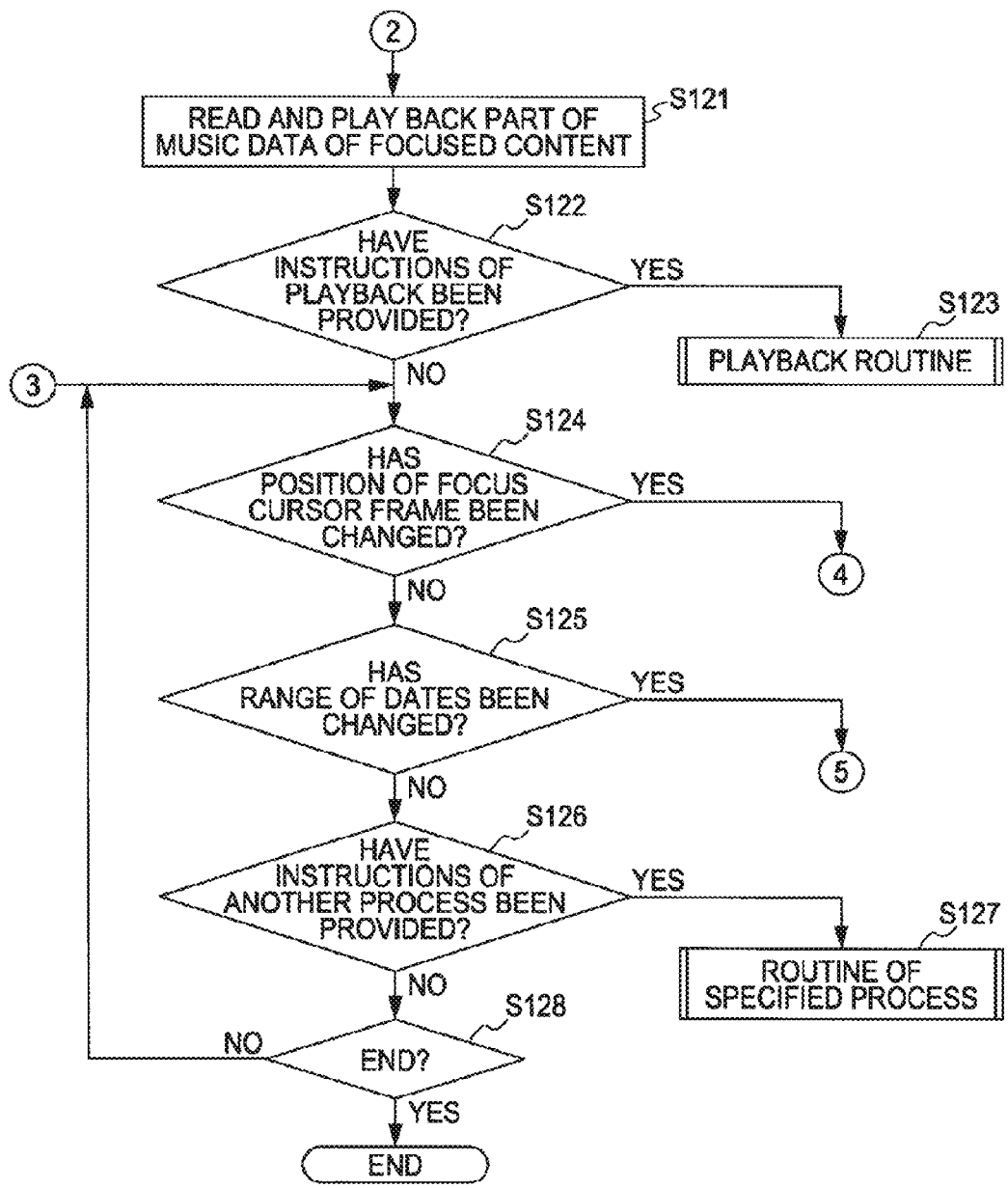
FIG. 13 shows part of the flowchart illustrating the example of the content list display process according to the embodiment of the present invention.

If determining in step S111 that the focused piece of song content is not public content but private content, the control unit 20 reads part of the song data of the focused piece of song content stored in the main data accumulating unit 1Aa of the content storing unit 1A and plays back the part of song data, which is output from the speaker 30 (step S121 in FIG. 13).

Then, the control unit 20 determines whether the user has performed a playback operation (step S122). If determining that the playback operation has been performed, the control unit 20 reads the song data of the focused piece of song content from the main data accumulating unit 1Aa and moves to a playback routine to play back the song data (step S123).

If determining in step S122 that the playback operation has not been performed or if determining in step S116 that a purchase operation has not been performed, the control unit 20 determines whether an operation of changing the position of the focus cursor frame FC2 has been performed by determining whether the selection dial 12 has been turned or whether the skip button 9B has been pressed (step S124).

If determining in step S124 that an operation of changing the position of the focus cursor frame FC2 has been performed, the control unit 20 pauses playback. Then, the process returns to step S106 in FIG. 11, where the control unit 20 detects a current position of the moved focus cursor frame FC2 and changes display in the content display unit 11. Then, the subsequent steps are repeated.

If determining in step S124 that the selection dial 12 has not been turned, the control unit 20 checks whether the range of display dates has been changed by turn of the zoom dial 13 (step S125). If the range has been changed, the process returns to step S101 in FIG. 11, and step S101 and the subsequent steps are performed in the above-described manner.

If determining in step S125 that the range of display dates has not been changed, the control unit 20 determines whether another operation has been performed by the user (step S126). If determining that another operation has been performed, the control unit 20 executes a process routine of the specified process (step S127).

If determining in step S126 that any operation has not been performed, the control unit 20 determines whether instructions to end display of content have been provided (step S128). If the instructions have not been provided, the process returns to step S124 and the subsequent steps are repeated. If determining in step S128 that the instructions have been provided, the control unit 20 ends the routine of displaying content.

Other than the above-described process flow of displaying content, the following process may be performed as events related to a display process.

(1) If a deleting operation is performed on a focused piece of song content, the control unit 20 deletes song data and associated data of the piece of song content, changes the range of display dates, and executes a display routine from step S101 in FIG. 11. As a result, the thumbnail of the piece of song content is deleted from the time axis bar TB1 and the content display unit 11.

(2) If a medium is loaded into the CD/DVD drive 23 or the memory card drive 24, the control unit 20 refers to associated data corresponding to the song content recorded on the medium to the inside of the medium or the distributing server, and generates temporary associated data. If instructions to capture content data of the song content from the medium to the audio apparatus 1 (ripping instruction) have been provided from the user, song data of the song content is stored in the HDD 22 and associated data thereof is generated. In any case, the content is displayed as private content. If a deleting instruction is provided when no ripping instruction is provided, the deleting instruction is ignored.

(3) If a medium is ejected from the CD/DVD drive 23 or the memory card drive 24 and if ripping has not been performed, the control unit 20 deletes generated temporary associated data and executes a re-display routine. If the content data of the song content has been stored in the HDD 22, nothing affects display.

(4) If additional information or updated information about public content is transmitted from the content distributing server 2, the control unit 20 executes a re-display routine including sorting of associated data.

<Modification 1>

In the above-described operation flow of displaying a content list, the content distributing server 2 is referred to for public content as necessary when the content list is to be re-displayed. However, if it takes much time in communication with the content distributing server 2, the responsiveness degrades and the user has stress. In order to overcome this problem, associated data is obtained from the content distributing server 2 in a background process even when the main power of the audio apparatus 1 is turned OFF so that the associated data stored in the associated data accumulating unit 1Ab is updated.

In this case, if a new song is released, the content distributing server 2 generates the associated data thereof and transmits the generated data to the audio apparatus 1. The audio apparatus 1 receives the associated data, stores the received data in the HDD 22, performs sorting on the basis of the date of release in the associated data, and stores a sort list in the HDD 22.

Accordingly, it becomes unnecessary to transmit a query command from the audio apparatus 1 to the content distributing server 2 every time a parameter for display (e.g., the start point and/or end point of the range of display dates) is updated.

Of course, an update button for associated data may be provided as necessary and a query command may be transmitted to the content distributing server 2 in accordance with a user operation of the update button if the user wants to.

<Modification 2>

As described above, distinction between private content and public content is not limited to distinction between "privately owned data" and "data before purchase or assignment".

For example, in a home, "content that can be watched/listened to by only oneself" can be distinguished from "content that can be watched/listened to by all family members". Also, "content that can be freely watched/listened to by a normal member of an association" can be distinguished from "content that can be watched/listened to by a supporting member".

It is clear that the above-described distinction can be realized by definition of owner/group/others described above in the section of "read/write attribute".

<Modification 3>

In the above-described embodiment, when a medium, that is, a disc or a memory card, is loaded into the CD/DVD drive 23 or the memory card drive 24, song content stored in the loaded medium is dealt with as private content. In other words, song content stored in a medium that is not loaded into the CD/DVD drive 23 or the memory card drive 24 but that is owned by a user is managed as public content.

However, that state is unfit for an actual condition in view of management by the user. By considering this, as shown in the bottom section in FIG. 14, one bit of an ownership attribute is provided as an attribute item of the associated data. In a medium owned by the user, such as a CD, DVD, or memory card, the ownership attribute is set to "1" indicating "owned by user". The owner attribute of the read/write attribute is set to "10" or "00" when no medium is loaded into the CD/DVD drive 23 or the memory card drive 24, and is set to "11" when a medium is loaded.

Accordingly, the medium can be managed in accordance with the actual condition of the ownership of the user. In this case, when the ownership attribute is "1" and when the owner attribute of the read/write attribute is "10" or "00", the medium is outside the content storing unit 1A. This state may be notified to the user by using an icon or another symbol or a voice message.

<Other Embodiments and Modifications>

In the above-described embodiment, associated data of public content is reliably accumulated in the associated data accumulating unit so as to be used for displaying a content list. However, the configuration may be designed so that the content list can be displayed without using the associated data accumulating unit.

In the above-described embodiment, private content is distinguished from public content on the basis of the read/write attribute. However, the discrimination may be performed on the basis of whether main data of the content is stored in the content storing unit 1A.

If the ownership attribute exists in the associated data, as in the example shown in FIG. 14, public content may be distinguished from private content on the basis of the ownership attribute. Alternatively, public content may be distinguished from private content by using the ownership attribute and the read/write attribute.

In the above-described embodiment, the audio apparatus 1 includes the content storing unit and the unit for playing back content data. However, the audio apparatus 1, if it functions as a content list display apparatus, does not need to include the unit for playing back content. For example, a personal computer that does not have a music player function can be used as the content list display apparatus.

In the above-described embodiment, a process of selecting an audio song is described. Thus, the date of announcement or sale of a song is used as the date of release determining a time attribute as a search key. If the content is a movie, the date of release of a movie or the date of sale of a DVD is used as the date of release. The date of release includes the date of release on the Internet.

The search key attribute is not limited to a time attribute, such as the above-described date of release. A content list may be displayed on the basis of another associated data or attribute data.

An attribute in the associated data that enables easy search and selection from among many pieces of song content can be selected as a key attribute. For example, the pieces of content can be sorted on the basis of artist names or in the order of duration of play.

In the above-described embodiment, music content is used as content, and thus the audio apparatus is used as the content list display apparatus and the content selecting and processing apparatus. However, as described above, the content displayed on a list is not limited to music content, but movie content, electronic book content, and other content may be applied. Thus, the apparatus is not limited to the audio apparatus.

For example, still image data, such as electronic photos, can be applied. In this case, when image data in a digital camera owned by someone and image data released on a website are to be displayed together, a content list and thumbnails can be displayed in the same manner by using the date of shooting or comment as a key.

In the above-described embodiment, the content distributing server connects to a wide area network, such as the Internet. Alternatively, the content distributing server may connect to an in-home LAN, an intra-company LAN, or a LAN within a specific group.

It should be understood by those skilled in the art that various modifications, combinations, sub-combinations and alterations may occur depending on design requirements and other factors insofar as they are within the scope of the appended claims or the equivalents thereof.

What is claimed is:

1. A content display method comprising acts of:
   (A) receiving a search request for pieces of content, from a user, the pieces of content each comprising main data and associated attributes, the search request specifying at least one search key attribute corresponding to one or more attributes of the pieces of content;
   (B) in response to receiving the search request, identifying one or more pieces of private content and one or more pieces of public content, each of the one or more pieces of private content and each of the one or more pieces of public content having a first attribute, the first attribute for a particular piece of private content denoting that the user was allowed to have edited the particular piece of private content, the first attribute for a particular piece of public content denoting that the user was not allowed to have edited the particular piece of public content, each of the one or more pieces of private content and each of the one or more pieces of public content having a time attribute and an access permission attribute, the access permission attribute for a piece of public content or a piece of private content indicating a person or group of people permitted to access the piece of public content or the piece of private content, the act of identifying one or more pieces of private content and one or more pieces of public content being based at least in part on the access permission attribute and information associated with the user;
   (C) causing first information associated with respective pieces of the private content and second information associated with respective pieces of the public content to be displayed on a display screen of a terminal operated by the user, wherein causing the first information and the second information to be displayed comprises causing the first information and the second information to be arranged in an order defined based at least in part on the time attributes of the respective pieces of the private content and the respective pieces of the public content;
   (D) receiving input indicating a selection of second information caused to be displayed in the act (C); and
   (E) obtaining the piece of public content associated with the second information selected via the input received in the act (D);
   wherein the content display method comprises an act, performed in response to receiving the input in the act (D), comprising providing access to preview data for the piece of public content associated with the second information, the preview data comprising still image data, and
   wherein each piece of the private content comprises associated data employed in causing the first information to be displayed in the act (C), each piece of the public content comprises associated data employed in causing the second information to be displayed in the act (C), and the associated data of the private content, the public content, or the private content and the public content comprises information which allows the first information to be visually distinguishable from the second information.

2. The content display method of claim 1, wherein the private content is stored in a content storing unit of the terminal.

3. The content display method of claim 1, wherein the public content is accessed through at least one distribution server.

4. The content display method of claim 1, wherein the act of identifying one or more pieces of private content and one or more pieces of public content is based at least in part on the time attribute.

5. The content display method of claim 1, wherein the act (C) comprises causing first images associated with respective pieces of private content and second images associated with respective pieces of public content to be arranged sequentially according to the time attribute.

6. The content display method of 1, wherein the associated data of the private content and the associated data of the public content are stored in a content storing unit, and are read from the content storing unit for use in causing the first information and the second information to be displayed in the act (C).

7. The content display method of claim 1, wherein the first information and the second information caused to be displayed in the act (C) are each associated with content from a first time period, and wherein the method further comprises acts of:
(F) receiving input indicating a selection of a second time period which is different than the first time period;
(G) in response to receiving the input in the act (F), causing third information, associated with content from the second time period, to be displayed on the display screen of the terminal operated by the user.

8. The content display method of claim 1, wherein the one or more pieces of private content and the one or more pieces of public content comprise still image data.

9. The content display method of claim 1, wherein the time attribute of each of the one or more pieces of private content is editable by the user.

10. The content display method of claim 1, wherein the still image data comprises a jacket photo.

11. At least one non-transitory computer-readable storage device having instructions stored thereon which, when executed, perform a content display method comprising acts of:
(A) receiving a search request for pieces of content, from a user, the pieces of content each comprising main data and associated attributes, the search request specifying at least one search key attribute corresponding to one or more attributes of the pieces of content;
(B) in response to receiving the search request, identifying one or more pieces of private content and one or more pieces of public content, each of the one or more pieces of private content and each of the one or more pieces of public content having a first attribute, the first attribute for a particular piece of private content denoting that the user was allowed to have edited the particular piece of private content, the first attribute for a particular piece of public content denoting that the user was not allowed to have edited the particular piece of public content, each of the one or more pieces of private content and each of the one or more pieces of public content having a time attribute and an access permission attribute, the access permission attribute for a piece of public content or a piece of private content indicating a person or group of people permitted to access the piece of public content or the piece of private content, the act of identifying one or more pieces of private content and one or more pieces of public content being based at least in part on the access permission attribute and information associated with the user;
(C) causing first information associated with respective pieces of the private content and second information associated with respective pieces of the public content to be displayed on a display screen of a terminal operated by the user, wherein causing the first information and the second information to be displayed comprises causing the first information and the second information to be arranged in an order defined based at least in part on the time attributes of the respective pieces of the private content and the respective pieces of the public content;
(D) receiving input indicating a selection of second information caused to be displayed in the act (C); and
(E) obtaining the piece of public content associated with the second information selected via the input received in the act (D);
wherein the content display method comprises an act, performed in response to receiving the input in the act (D), comprising providing access to preview data for the piece of public content associated with the second information, the preview data comprising still image data, and
wherein each piece of the private content comprises associated data employed in causing the first information to be displayed in the act (C), each piece of the public content comprises associated data employed in causing the second information to be displayed in the act (C), and the associated data of the private content, the public content, or the private content and the public content comprises information which allows the first information to be visually distinguishable from the second information.

12. The at least one non-transitory computer-readable storage device of claim 11, wherein the private content is stored in a content storing unit of the terminal.

13. The at least one non-transitory computer-readable storage device of claim 11, wherein the public content is accessed through at least one distribution server.

14. The at least one non-transitory computer-readable storage device of claim 11, wherein the the act of identifying one or more pieces of private content and one or more pieces of public content is based at least in part on the time attribute.

15. The at least one non-transitory computer-readable storage device of claim 11, wherein the act (C) comprises causing first images associated with respective pieces of private content and second images associated with respective pieces of public content to be arranged sequentially according to the time attribute.

16. The at least one non-transitory computer-readable storage device of claim 11, wherein the associated data of the private content and the associated data of the public content are stored in a content storing unit, and are read from the content storing unit for use in causing the first information and the second information to be displayed in the act (C).

17. The at least one computer-readable storage device of claim 11, wherein the first information and the second information caused to be displayed in the act (C) are each associated with content from a first time period, and wherein the method further comprises acts of:
(F) receiving input indicating a selection of a second time period which is different than the first time period;
(G) in response to receiving the input in the act (F), causing third information, associated with content from the second time period, to be displayed on the display screen of the terminal operated by the user.

18. The at least one computer-readable storage device of claim 11, wherein the one or more pieces of private content and the one or more pieces of public content comprise still image data.

19. The at least one computer-readable storage device of claim 11, wherein the time attribute of each of the one or more pieces of private content is editable by the user.

20. An information processing apparatus comprising:
at least one memory, storing program instructions; and
at least one processor, programmed via the program instructions to:
receive a search request for pieces of content, from a user, the pieces of content each comprising main data and associated attributes, the search request specifying at least one search key attribute corresponding to one or more attributes of the pieces of content;
in response to receiving the search request, identify one or more pieces of private content and one or more pieces of public content, each of the one or more pieces of private content and each of the one or more pieces of public content having a first attribute, the first attribute for a particular piece of private content denoting that the user was allowed to have edited the particular piece of private content, the first attribute for a particular piece of public content denoting that the user was not allowed to have edited the particular piece of public content, each of the one or more pieces of private content and each of the one or more pieces of public content having a time attribute and an access permission attribute, the access permission attribute for a piece of public content or a piece of private content indicating a person or group of people permitted to access the piece of public content or the piece of private content, the identifying one or more pieces of private content and one or more pieces of public content being based at least in part on the access permission attribute and information associated with the user;
cause first information associated with respective pieces of the private content and second information associated with respective pieces of the public content to be displayed on a display screen of a terminal operated by the user, wherein causing the first information and the second information to be displayed comprises causing the first information and the second information to be arranged in an order defined based at least in part on the time attributes of the respective pieces of the private content and the respective pieces of the public content;
receive input indicating a selection of second information by the user; and
obtain the piece of public content associated with the second information selected via the input;
wherein the at least one processor is further programmed to provide, in response to receiving the input indicating the selection of the second information, access to preview data for the piece of public content associated with the second information, the preview data comprising still image data, and
wherein each piece of the private content comprises associated data employed in causing the first information to be displayed, each piece of the public content comprises associated data employed in causing the second information to be displayed, and the associated data of the private content, the public content, or the private content and the public content comprises information which allows the first information to be visually distinguishable from the second information.

21. The information processing apparatus of claim 20, further comprising a content storing unit, and wherein the at least one processor is programmed to obtain the piece of private content from the content storing unit.

22. The information processing apparatus of claim 20, wherein the at least one processor is programmed to cause first images associated with respective pieces of private content and second images associated with respective pieces of public content to be arranged sequentially on the display screen of the terminal according to the time attribute.

23. The information processing apparatus of claim 20, wherein the first information and the second information which the at least one processor is programmed to cause to be displayed are each associated with content from a first time period, and wherein the at least one processor is further programmed to:
receive input indicating a selection of a second time period which is different than the first time period;
in response to receiving the input indicating the selection of the second time period, cause third information, associated with content from the second time period, to be displayed on the display screen of the terminal operated by the user.

24. The information processing apparatus of claim 20, wherein the one or more pieces of private content and the one or more pieces of public content comprise still image data.

25. The information processing apparatus of claim 20, wherein the time attribute of each of the one or more pieces of private content is editable by the user.

* * * * *